US012761328B2

(12) United States Patent
Azuma

(10) Patent No.: US 12,761,328 B2
(45) Date of Patent: Oct. 13, 2026

(54) DISTANCE MEASURING DEVICE

(71) Applicant: DENSO CORPORATION, Kariya-city (JP)

(72) Inventor: Kenta Azuma, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 1131 days.

(21) Appl. No.: 17/662,828

(22) Filed: May 10, 2022

(65) Prior Publication Data

US 2022/0268901 A1 Aug. 25, 2022

Related U.S. Application Data

(63) Continuation of application No. PCT/JP2020/041544, filed on Nov. 6, 2020.

(30) Foreign Application Priority Data

Nov. 12, 2019 (JP) ................................ 2019-204614
Sep. 30, 2020 (JP) ................................ 2020-166004

(51) Int. Cl.
*G01S 7/4865* (2020.01)
*G01S 7/487* (2006.01)
(Continued)

(52) U.S. Cl.
CPC .......... *G01S 7/4865* (2013.01); *G01S 7/4876* (2013.01); *G01S 17/10* (2013.01); *G01S 17/931* (2020.01)

(58) Field of Classification Search
CPC ...... G01S 7/4865; G01S 7/4876; G01S 17/10; G01S 17/931
See application file for complete search history.

(56) References Cited

U.S. PATENT DOCUMENTS 9,537,956 B1 1/2017 Sibenac et al.
2011/0215249 A1* 9/2011 Takahashi ............ G01T 1/2985 250/369

(Continued)

FOREIGN PATENT DOCUMENTS

JP 2013036765 A 2/2013
JP 2017129426 A 7/2017

(Continued)

*Primary Examiner* — Isam A Alsomiri
*Assistant Examiner* — Benjamin Wade Clouser
(74) *Attorney, Agent, or Firm* — Precision Patents, P.C.

(57) ABSTRACT

A distance measuring device includes a light emitting unit, a light receiving array unit, a signal intensity calculation unit, a signal time calculation unit, an intensity correction unit, and a distance calculation unit. The light emitting unit emits pulsed signal light. The light receiving array unit includes a plurality of photodetectors, each of which outputs a pulse signal in response to incidence of a photon. The signal intensity calculation unit calculates a signal intensity that indicates a light intensity of the signal light received by the light receiving array unit. The signal time calculation unit calculates a rise time and a fall time of the signal light detected by the light receiving array unit. The intensity correction unit corrects at least one of the rise time and the fall time calculated by the signal time calculation unit based on the signal intensity calculated by the signal intensity calculation unit.

21 Claims, 19 Drawing Sheets

(51) Int. Cl.

| | |
|---|---|
| ***G01S 17/10*** | (2020.01) |
| ***G01S 17/931*** | (2020.01) |

(56) References Cited

U.S. PATENT DOCUMENTS

| | | | | |
|---|---|---|---|---|
| 2018/0259629 | A1 | 9/2018 | Oohata et al. | |
| 2018/0284247 | A1* | 10/2018 | Campbell | G01S 17/10 |
| 2018/0356502 | A1* | 12/2018 | Hinderling | G01S 7/4818 |
| 2020/0088853 | A1* | 3/2020 | Kubota | G01S 7/4865 |
| 2020/0132817 | A1* | 4/2020 | Ueno | G01S 17/14 |
| 2022/0146647 | A1* | 5/2022 | Sakazume | G04F 10/04 |
| 2022/0291387 | A1* | 9/2022 | Pacala | G01S 7/4817 |

FOREIGN PATENT DOCUMENTS

| | | | | |
|---|---|---|---|---|
| JP | 2018091760 A | | 6/2018 | |
| JP | 2019007950 A | * | 1/2019 | G01S 7/4865 |

* cited by examiner

DISTANCE MEASURING DEVICE

CROSS-REFERENCE TO RELATED APPLICATION

This application is a continuation application of International Application No. PCT/JP2020/041544 filed Nov. 6, 2020 which designated the U.S. and claims priority to Japanese Patent Application No. 2019-204614 filed Nov. 12, 2019, and Japanese Patent Application No. 2020-166004 filed Sep. 30, 2020, the contents of each of which are incorporated herein by reference.

BACKGROUND

Technical Field

The present disclosure relates to a distance measuring device that emits light and measures a distance to an object that reflects the light.

Related Art

In a known distance measuring device that emits pulsed signal light and receives reflected light from an object, measures a time from emission to reception, and thereby measures a distance to the object reflecting the signal light, a plurality of avalanche photodiodes are used to detect the signal light.

DESCRIPTION OF SPECIFIC EMBODIMENTS

Figure 1A:
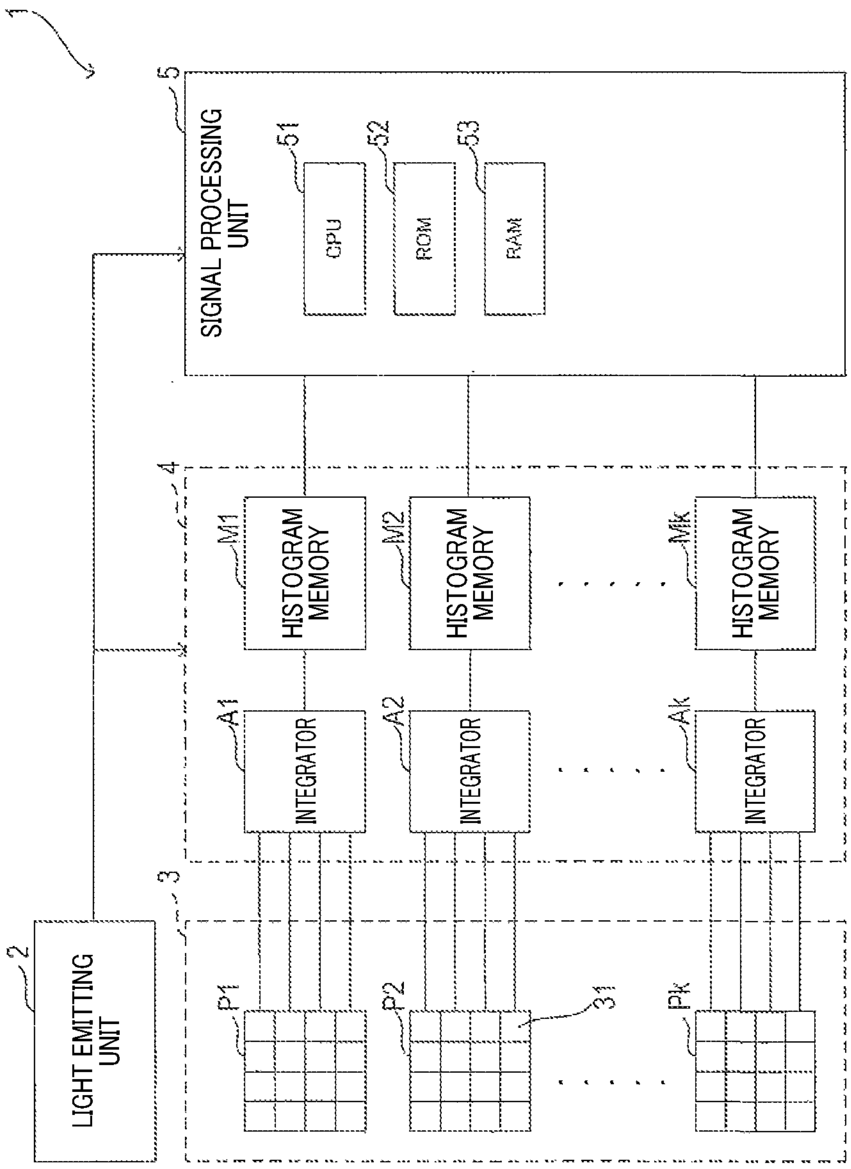
FIG. 1A is a block diagram of a distance measuring device according to a first embodiment.

As a result of detailed research that was performed by the present inventors, an issue was found with the above known distance measuring device using the plurality of avalanche photodiodes operating in Geiger mode, as described in WO 2017/042993, that distance measurements may vary depending on the intensity of the signal light or the intensity of background light such as sunlight. In view of the foregoing, it is desired to have a technique for suppressing variations in distance measurement to improve the distance measurement accuracy.

One aspect of the present disclosure provides a distance measuring device including a light emitting unit, a light receiving array unit, a signal intensity calculation unit, a signal time calculation unit, an intensity correction unit, and a distance calculation unit.

The light emitting unit is configured to emit pulsed signal light. The light receiving array unit includes a plurality of photodetectors, each of which is configured to output a pulse signal in response to incidence of a photon.

The signal intensity calculation unit is configured to calculate a signal intensity that indicates a light intensity of the signal light received by the light receiving array unit.

The signal time calculation unit is configured to calculate a rise time and a fall time of the signal light detected by the light receiving array unit.

The intensity correction unit is configured to correct at least one of the rise time and the fall time calculated by the signal time calculation unit based on the signal intensity calculated by the signal intensity calculation unit.

The distance calculation unit is configured to, in response to the rise time being corrected, calculate an object distance that is a distance to an object that reflected the signal light, based on at least the corrected rise time, and in response to the fall time being corrected, calculate the object distance based on at least the corrected fall time.

The distance measuring device of the present disclosure configured as above corrects the rise time and the fall time based on the signal intensity, and further calculates the object distance based on the corrected rise time and the corrected fall time. Therefore, the distance measuring device of the present disclosure can suppress variations in distance measurement caused by the signal intensity and improve the distance measurement accuracy.

Another aspect of the present disclosure provides a distance measuring device including a light emitting unit, a light receiving array unit, a temperature detection unit, a signal time calculation unit, a temperature correction unit, and a distance calculation unit.

The temperature detection unit is configured to detect a temperature of the light receiving array unit. The temperature correction unit is configured to correct at least one of the rise time and the fall time calculated by the signal time calculation unit based on the temperature detected by the temperature detection unit.

The distance measuring device of the present disclosure configured as above corrects the rise time and the fall time based on the temperature of the light receiving array unit, and further calculates the object distance based on the corrected rise time and the corrected fall time. Therefore, the distance measuring device of the present disclosure can suppress variations in distance measurement caused by the temperature of the light receiving array unit and improve the distance measurement accuracy.

First Embodiment

Hereinafter, a first embodiment of the present disclosure will be described with reference to the accompanying drawings.

The distance measuring device 1 according to the present embodiment is mounted to a vehicle and measures distances to various objects around the vehicle.

As illustrated in FIG. 1A, the distance measuring device 1 includes a light emitting unit 2, a light receiving array unit 3, a counting unit 4, and a signal processing unit 5.

The light emitting unit 2 repeatedly emits pulsed laser light (hereinafter referred to as signal light) at preset time intervals and provides a notification of the emission timing to the counting unit 4 and the signal processing unit 5. The laser light emission cycle is hereinafter referred to as a measurement cycle.

The light receiving array unit 3 includes a plurality of pixel units P1, P2, . . . , Pk. k is an integer greater than or equal to 2. Each pixel unit Pi includes N photodetectors 31, where N is an integer greater than or equal to 2. Each photodetector 31 outputs a pulse signal having a preset pulse width in response to incidence of a photon.

The counting unit 4 includes a plurality of integrators A1, A2, . . . , Ak and a plurality of histogram memories M1, M2, . . . , Mk.

The integrators A1, A2, . . . , Ak are connected to pixel units P1, P2, . . . , Pk, respectively. The integrator Ai outputs an integrated signal indicating a sum of the pulse signals received from the N photodetectors 31 forming the pixel unit Pi (hereafter referred to as light intensity), where i is an integer from 1 to k.

The histogram memories M1, M2, . . . , Mk are connected to integrators A1, A2, . . . , Ak, respectively. The histogram memory Mi stores the light intensity indicated by an integrated signal received from the integrator Ai each time a preset acquisition cycle elapses from the latest emission timing received from the light emitting unit 2 as a start point, in association with an elapsed time from the latest emission timing received from the light emitting unit 2. The histogram memories M1, M2, . . . , Mk are connected to the signal processing unit 5.

The signal processing unit 5 is an electronic control unit (ECU) configured around at least one microcomputer including a CPU 51, a ROM 52, and a RAM 53, and other components. Various functions of the microcomputer are implemented by the CPU 51 executing a program stored in a non-transitory tangible storage medium. In the present embodiment, the ROM 52 corresponds to the non-transitory tangible storage medium storing the program. Execution of this program enables implementation of a method corresponding to the program. Some or all of the functions performed by the CPU 51 may be configured in hardware using one or more ICs. The number of microcomputers forming the signal processing unit 5 may be one or more.

Figure 2:
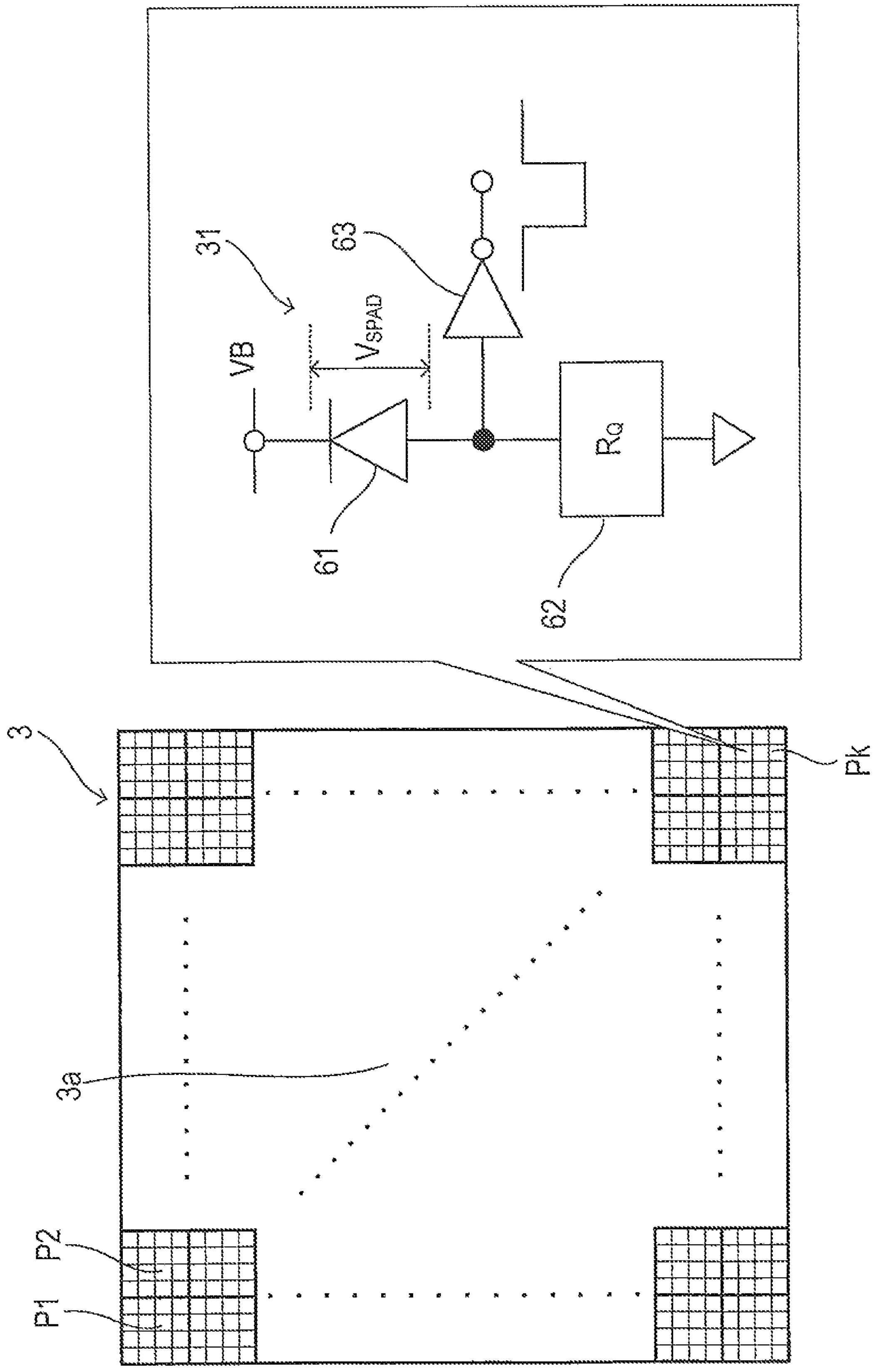
FIG. 2 is a schematic diagram of a light receiving array unit and photodetectors.

As illustrated in FIG. 2, the light receiving array unit 3 has the plurality of pixel units P1, P2, . . . , . . . , . . . Pk arranged in a two-dimensional matrix.

The photodetector 31 includes a single photon avalanche diode (SPAD) 61, a quench resistor 62, and a pulse output 63. SPAD is an abbreviation for Single Photon Avalanche Diode.

The SPAD 61 is an avalanche photodiode that operates in Geiger mode, capable of detecting incidence of a single photon. The SPAD 61 has a cathode connected to a reverse bias voltage VB and an anode connected to ground through the quench resistor 62. A voltage drop caused by current generated when the SPAD 61 breaks down upon incidence of a photon thereon flowing through the quench resistor 62 causes Geiger discharge of the SPAD 61 to be stopped. A resistive element having a predefined resistance value or a MOSFET whose on-resistance can be set by a gate voltage may be used as the quench resistor 62.

The pulse output unit 63 is connected to the anode of the SPAD 61. The pulse output unit 63 outputs a digital signal with a value of one when the SPAD 61 is not breaking down. When a voltage higher than a threshold voltage is generated across the quench resistor 62 due to current flowing through the quench resistor 62 upon breaking down of the SPAD 61, the pulse output unit 63 outputs a digital pulse with a value of zero as a pulse signal as described above.

A procedure of a distance measuring process performed by the CPU 51 of the signal processing unit 5 will now be described. The distance measuring process is repeatedly performed each time a measurement cycle elapses while the light emitting unit 2 is emitting laser light.

Figure 3:
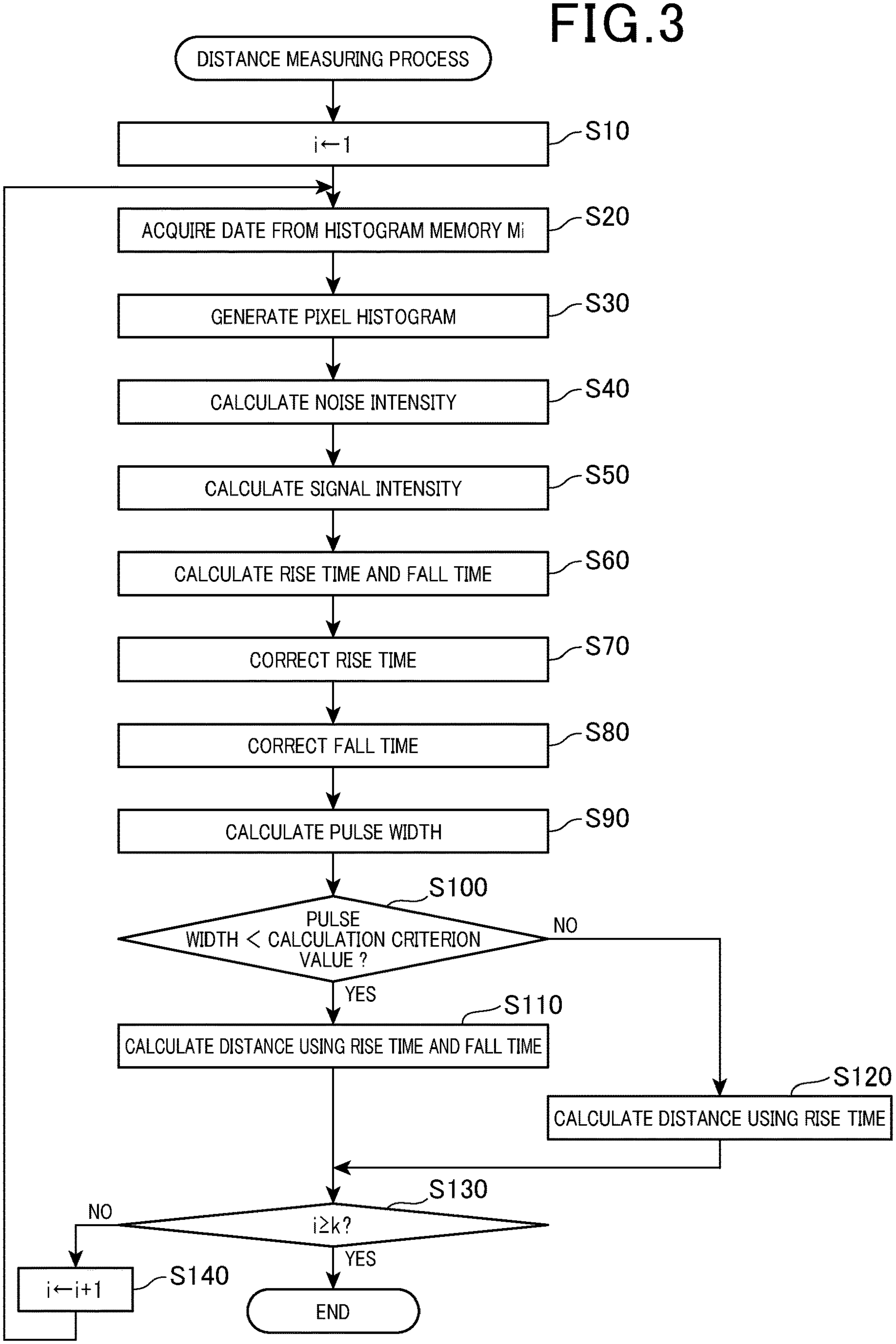
FIG. 3 is a flowchart illustrating a distance measuring process according to the first embodiment.

As illustrated in FIG. 3, upon initiation of the distance measuring process, the CPU 51, at S10, stores one in the RAM 53 as a pixel indication value i.

At S20, the CPU 51 acquires stored data from the histogram memory Mi.

At S30, the CPU 51 generates a pixel histogram for the i-th pixel unit Pi using the stored data acquired at S20.

Figure 4:
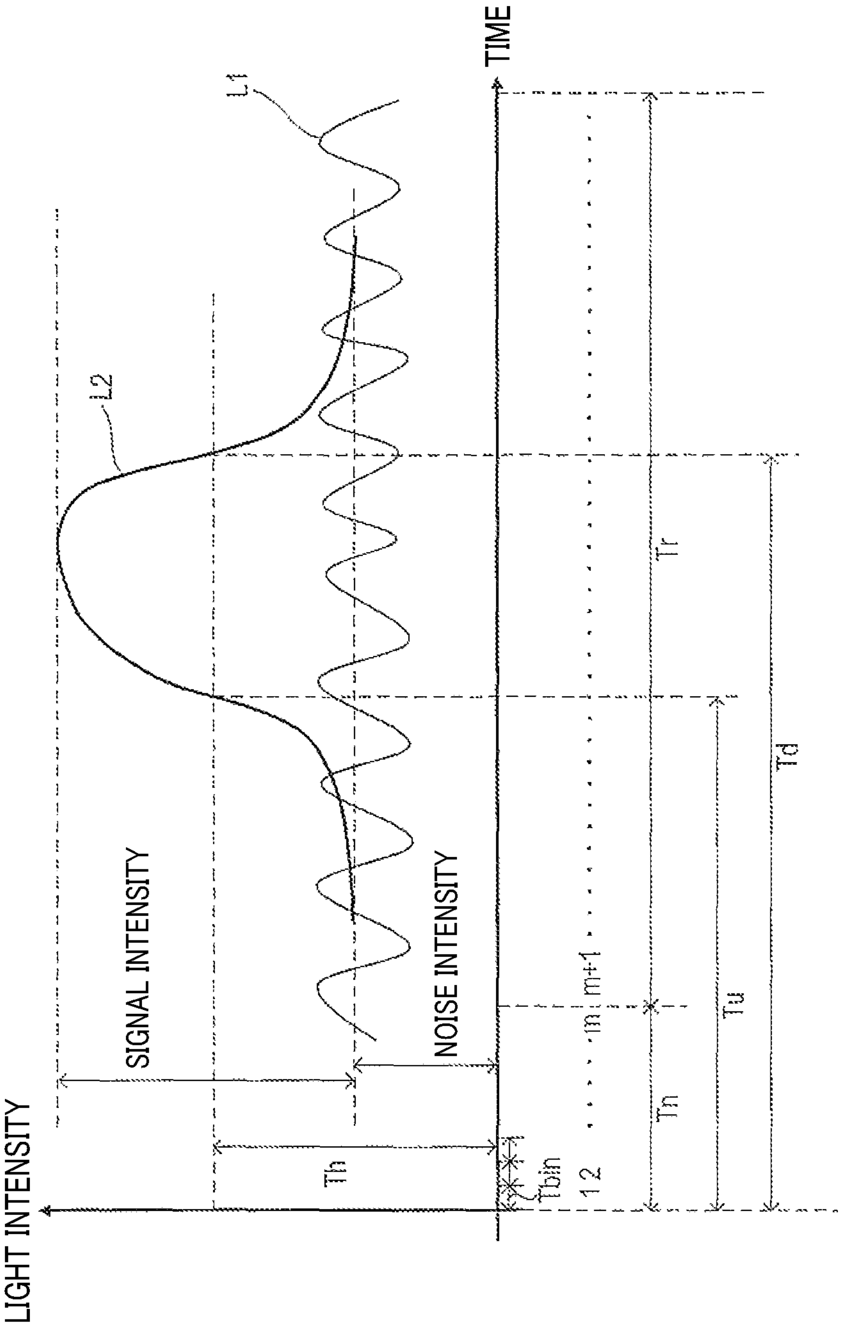
FIG. 4 is a schematic diagram of a pixel histogram.

As illustrated in FIG. 4, the pixel histogram generated using the stored data in the histogram memory Mi is a histogram showing time variations in the light intensity with the abscissa axis corresponding to elapsed time from the latest emission timing and the ordinate axis corresponding to light intensity.

The pixel histogram shows the light intensity for each time bin Tbin. The time bin Tbin is a time range that is a unit scale of the pixel histogram. The length of the time bin Tbin is equal to the acquisition cycle described above.

The time bins Tbin are assigned with identification numbers 1, 2, 3, . . . in descending order of proximity from the latest emission timing. The time bins Tbin assigned with identification numbers from 1 to m correspond to a noise calculation period Tn. The time bins Tbin assigned with identification numbers greater than m correspond to a distance calculation period Tr. m is an integer greater than or equal to 2.

The curve L1 in FIG. 4 is a noise waveform acquired from responses of the photodetectors 31 to incidence of background light such as sunlight. The curve L2 in FIG. 4 is a signal waveform acquired from responses of the photodetectors 31 to incidence of the signal light reflected by an object.

The pixel histogram shows a waveform acquired by adding the light intensity of the noise waveform and the light intensity of the signal waveform (hereafter, a received-light waveform).

Subsequently, as illustrated in FIG. 3, at S40, the CPU 51 calculates the noise intensity using the pixel histogram generated at S30. Specifically, the CPU 51 calculates the average of noise intensities of the received-light waveform over the noise calculation period Tn, and calculates this average as the noise intensity.

At S50, the CPU 51 calculates the signal intensity using the pixel histogram generated at S 30. Specifically, the CPU 51 calculates a maximum light intensity of the received-light waveform within the distance calculation period Tr. Then, the CPU 51 subtracts the noise intensity calculated at S40 from the maximum light intensity of the received-light waveform to calculate a subtracted value. This subtracted value is used as the signal intensity.

At S60, the CPU 51 calculates a rise time Tu and a fall time Td using the pixel histogram generated at S30. As illustrated in FIG. 4, the rise time Tu is the time during the distance calculation period Tr when the light intensity of the received-light waveform of the pixel histogram transitions from below a threshold value Th to above the threshold value Th. The fall time Td is the time during the distance calculation period Tr when the light intensity of the received-light waveform of the pixel histogram transitions from above the threshold value Th to below the threshold value Th.

The CPU 51 calculates the threshold value Th using the noise intensity calculated at S40 and the signal intensity calculated at S50. Specifically, the CPU 51 calculates a multiplied value by multiplying the signal intensity by a threshold calculation coefficient preset to be greater than 0 and less than 1. In the present embodiment, the threshold calculation coefficient is set to 0.5. The CPU 51 then calculates an added value by adding the noise intensity to the multiplied value and sets the added value as the threshold value Th. Subsequently, as illustrated in FIG. 3, the CPU 51 corrects the rise time Tu at S70.

Figure 5:
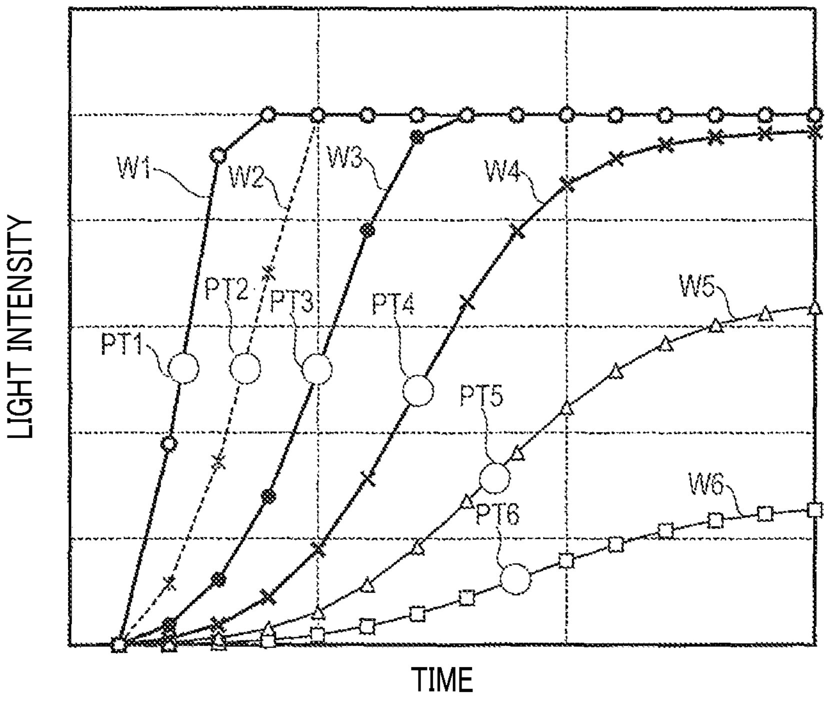
FIG. 5 is an illustration of a rising part of a received-light waveform when the emission light intensity is changed.

FIG. 5 illustrates a rising part of the received-light waveform when the light intensity of the signal light emitted from the light emitting unit 2 (hereinafter referred to as the emission light intensity) is changed with the distance to the object kept unchanged.

As illustrated in FIG. 5, the higher the light intensity of the received-light waveform, the earlier it rises. FIG. 5 illustrates the received-light waveforms W1, W2, W3, W4, W5, and W6 in descending order of emission light intensity. The points PT1, PT2, PT3, PT4, PT5, and PT6 are half-value positions of the rise for the received-light waveforms W1, W2, W3, W4, W5, and W6, respectively. As indicated by the points PT1, PT2, PT3, PT4, PT5, and PT6, the higher the emission light intensity, the more the rise time Tu is advanced, even though the distance to the object is kept unchanged.

There are the following two reasons for the earlier rise of the received-light waveform as the emission light intensity increases.

The first reason is that, as the emission light intensity increases, a response of the emission light tends to occur at the base.

The second reason is that, since, once a SPAD responds, it takes time to be ready to respond again (i.e., recharging time), the more time elapses during the light emission time, the fewer SPADs are ready to respond. The higher the emission light intensity, the more the number of SPADs that are ready to respond decreases.

Therefore, to keep the rise time Tu constant regardless of the intensity of the light received by the SPADs, the rise time Tu may be corrected based on the signal intensity.

Figure 6:
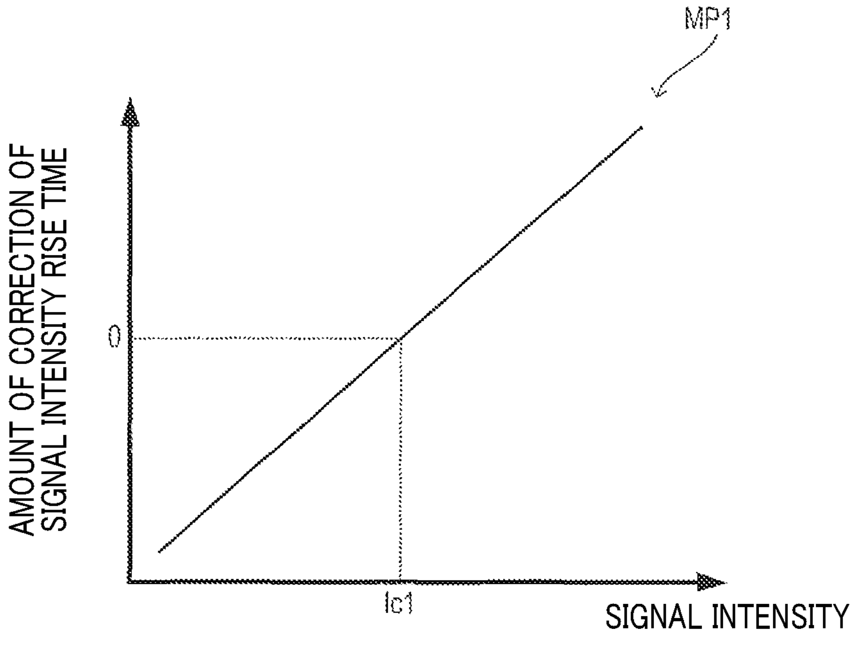
FIG. 6 is an illustration of a signal-intensity rise time correction map.

Specifically, at S70, the CPU 51 calculates, using the signal intensity calculated at S50, an amount of correction of the signal-intensity rise time with reference to a signal-intensity rise time correction map MP1 stored in the ROM 52. The signal-intensity rise time correction map MP1 sets a correspondence relationship between the signal intensity and the amount of correction of the signal intensity rise time, as illustrated in FIG. 6, for example. The signal-intensity rise time correction map MP1 illustrated in FIG. 6, for example, indicates the correspondence relationship between the signal intensity and the amount of correction of the signal-intensity rise time such that the amount of correction of the signal-intensity rise time is zero at an intermediate reference intensity Ic1. That is, for the signal intensity lower than the reference intensity Ic1, the amount of correction of the signal-intensity rise time is negative. The larger the difference between the signal intensity and the reference intensity Ic1, the larger the absolute value of the amount of correction of the signal intensity rise time. For the signal intensity higher than the reference intensity Ic1, the amount of correction of the signal-intensity rise time is positive. The larger the difference between the signal intensity and the reference intensity Ic1, the larger the absolute value of the amount of correction of the signal intensity rise time. Therefore, for the signal intensity lower than the reference intensity Ic1, the rise time Tu is corrected to be decreased. For the signal intensity higher than the reference intensity Ic1, the rise time Tu is corrected to be increased.

The CPU 51 then calculates a sum of the calculated amount of correction of the signal-intensity rise time and the rise time Tu. This summed value is used as a corrected rise time. Correction of the rise time Tu at S70 is thereby completed.

Subsequently, as illustrated in FIG. 3, the CPU 51 then corrects the fall time Td at S80.

Figure 7:
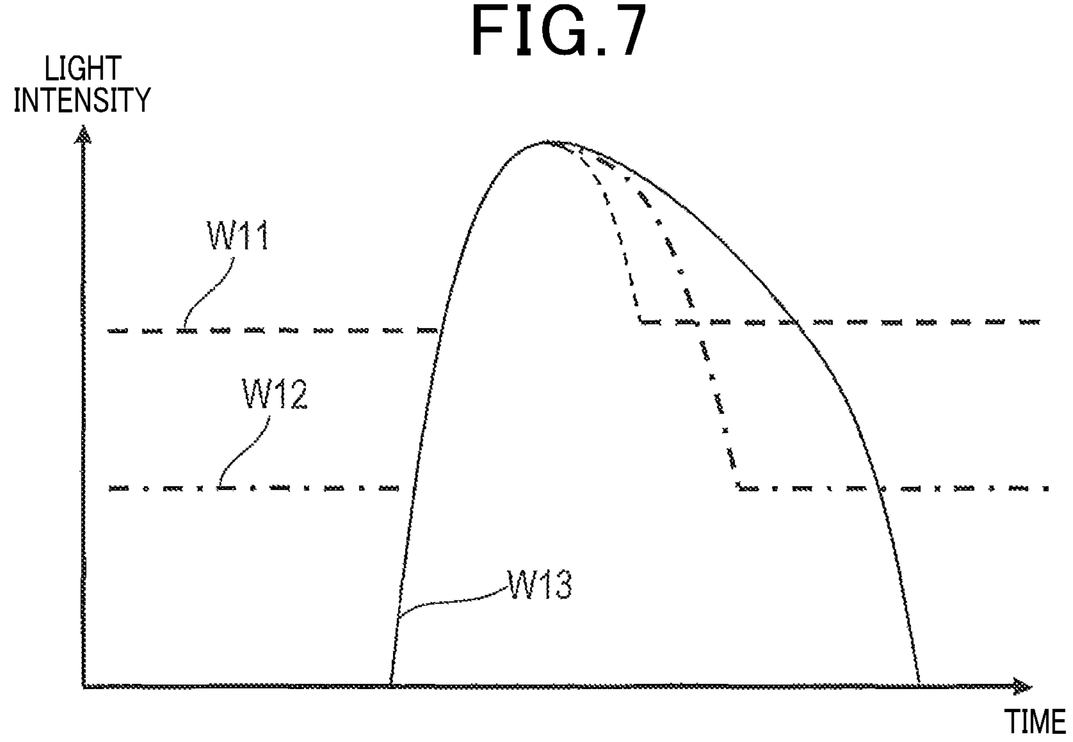
FIG. 7 is an illustration of a received-light waveform when the sunlight intensity is changed.

FIG. 7 illustrates the received-light waveforms when the light intensity of sunlight (hereafter, sunlight intensity) is changed with both the distance to the object and as the emission light intensity kept unchanged. FIG. 7 illustrates the received-light waveforms W11, W12, and W 13 in descending order of sunlight intensity.

Figure 8:
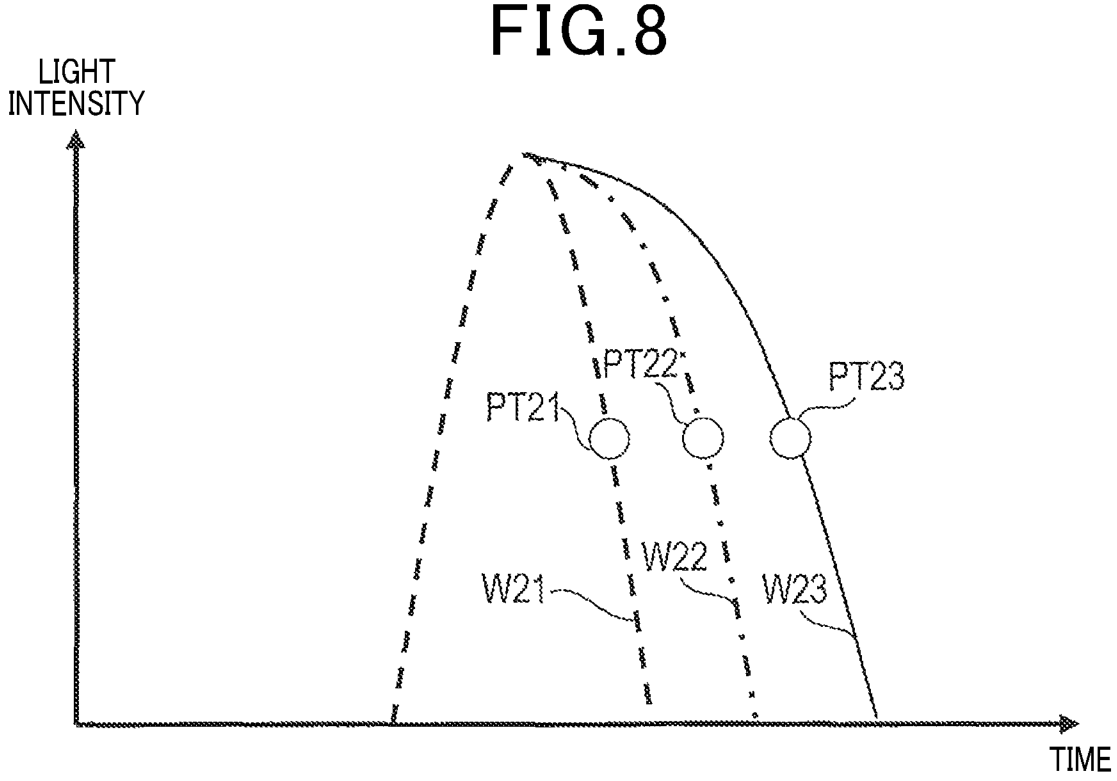
FIG. 8 is an illustration of a received-light waveform corrected for the effect of response to sunlight.

FIG. 8 illustrates the received-light waveforms corrected for the effect of response to sunlight in FIG. 7. FIG. 8 illustrates the received-light waveforms W21, W22, and W 23 in descending order of sunlight intensity. The points PT21, PT22, and PT23 are half-value positions of the fall for the received-light waveforms W21, W2, W23, and W22, respectively. As indicated by the points PT21, PT22, and PT23, the higher the sunlight intensity, the more the fall time Td is advanced, even though both the distance to the object and the emission light intensity are kept unchanged.

The reasons why the fall time Td varies with sunlight intensity are as follows.

Each SPAD has a dead time following a response. That is, until the dead time elapses, a response can not be externally observed even if the SPAD responds.

Under constant sunlight intensity, the number of SPADs that recover from the dead time and the number of SPADs that are responding are in equilibrium. However, upon the SPADs receiving the signal light emitted from the light emitting unit 2 and then reflected by an object, this equilibrium state is disrupted, and the SPADs are inhibited from recovery from the dead time until the reflected light disappears (i.e., a re-response may occur that is not observed externally). When the reflected light disappears and the dead time elapses, the SPADs will recover at the same timing as the SPADs that responded to the reflected light. Therefore, apparently, more SPADs will recover than the SPADs that responded to the reflected light, leading to an advanced fall time. Thus, the higher the sunlight intensity, the more the fall time Td is advanced.

Therefore, to keep the rise time Td constant regardless of the sunlight intensity, the fall time Td may be corrected based on the noise intensity.

Figure 9:
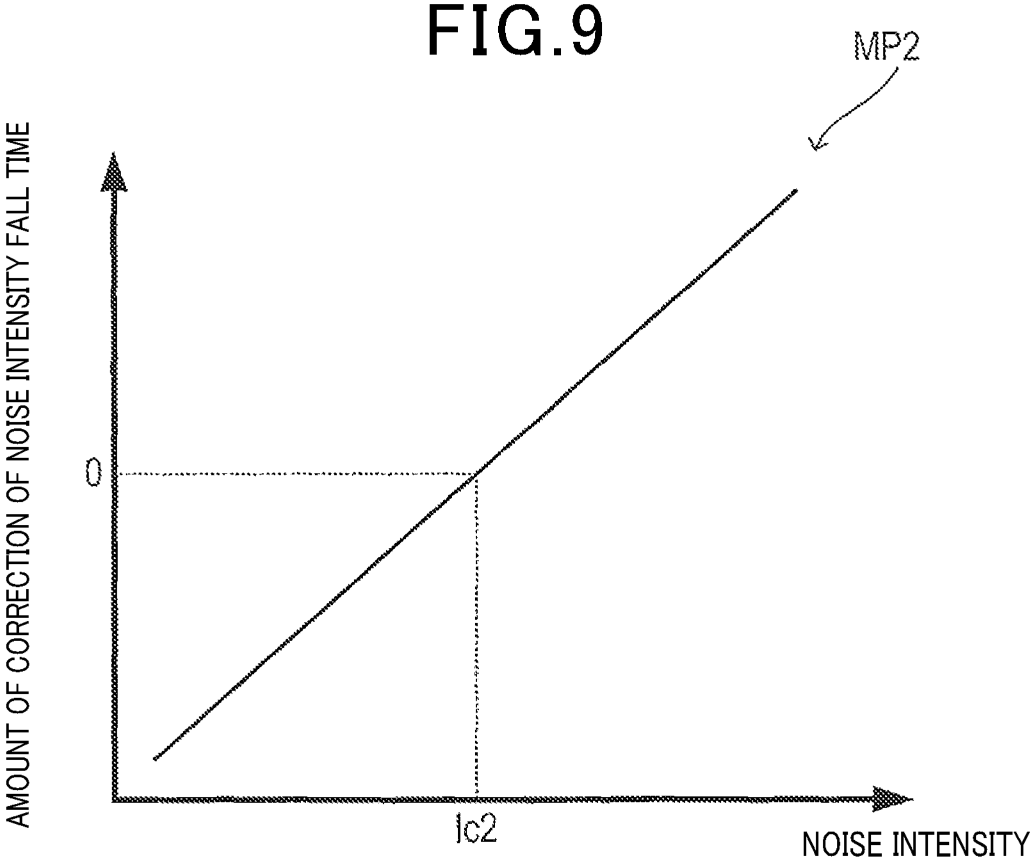
FIG. 9 is an illustration of a noise-intensity fall time correction map according to the first embodiment.

Specifically, at S80, the CPU 51 calculates, using the noise intensity calculated at S40, an amount of correction of the noise intensity fall time with reference to a noise intensity fall time correction map MP2 stored in the ROM 52. The noise intensity fall time correction map MP2 sets a correspondence relationship between the noise intensity and the amount of correction of the noise intensity fall time, as illustrated in FIG. 9, for example. The noise intensity fall time correction map MP2 illustrated in FIG. 9, for example, indicates the correspondence relationship between the noise intensity and the amount of correction of the noise intensity fall time such that the amount of correction of the noise intensity fall time Td is zero at an intermediate reference intensity Ic2. That is, for the noise intensity lower than the reference intensity Ic2, the amount of correction of the noise intensity fall time is negative. The larger the difference between the noise intensity and the reference intensity Ic2, the larger the absolute value of the amount of correction of the noise intensity fall time. For the noise intensity higher than the reference intensity Ic2, the amount of correction of the noise intensity rise time is positive. The larger the difference between the noise intensity and the reference intensity Ic2, the larger the absolute value of the amount of correction of the noise intensity fall time. Therefore, for the noise intensity lower than the reference intensity Ic2, the fall time Td is corrected to be decreased. For the noise intensity higher than the reference intensity Ic2, the fall time Td is corrected to be increased.

The CPU 51 then calculates a sum of the calculated amount of correction of the noise intensity fall time and the fall time Td. This summed value is used as a corrected fall time. Correction of the fall time Td at S80 is thereby completed.

Specifically, the CPU 51 calculates a subtracted value by subtracting the calculated corrected rise time from the calculated corrected fall time. This subtracted value is used as a pulse width.

The CPU 51, at S100, determines whether the pulse width calculated at S90 is less than a predefined calculation criterion value. If the pulse width is less than the calculation criterion value, then at S110 the CPU 51 calculates a distance to an object that reflected the signal light (hereinafter referred to as an object distance) using the rise time and the fall time, and then proceeds to S130. Specifically, the CPU 51 calculates the distance to the object based on a signal detection time that is set to an intermediate time between the corrected rise time calculated at S70 and the corrected fall time calculated at S80.

If the pulse width is greater than or equal to the calculation criterion value, then at S120 the CPU 51 calculates the object distance using the rise time, and then proceeds to S130. Specifically, the CPU 51 calculates the object distance based on a signal detection time that is set to the corrected rise time calculated at S70.

In a case where the object reflecting the signal light is a highly reflective object, such as a reflector or a mirror, multiple reflections of the signal light may occur between a surface or a mirror of the distance measuring device 1 and the highly reflective object. In such a case, as illustrated in FIG. 10, the received-light waveform may become abnormal.

Figure 10:
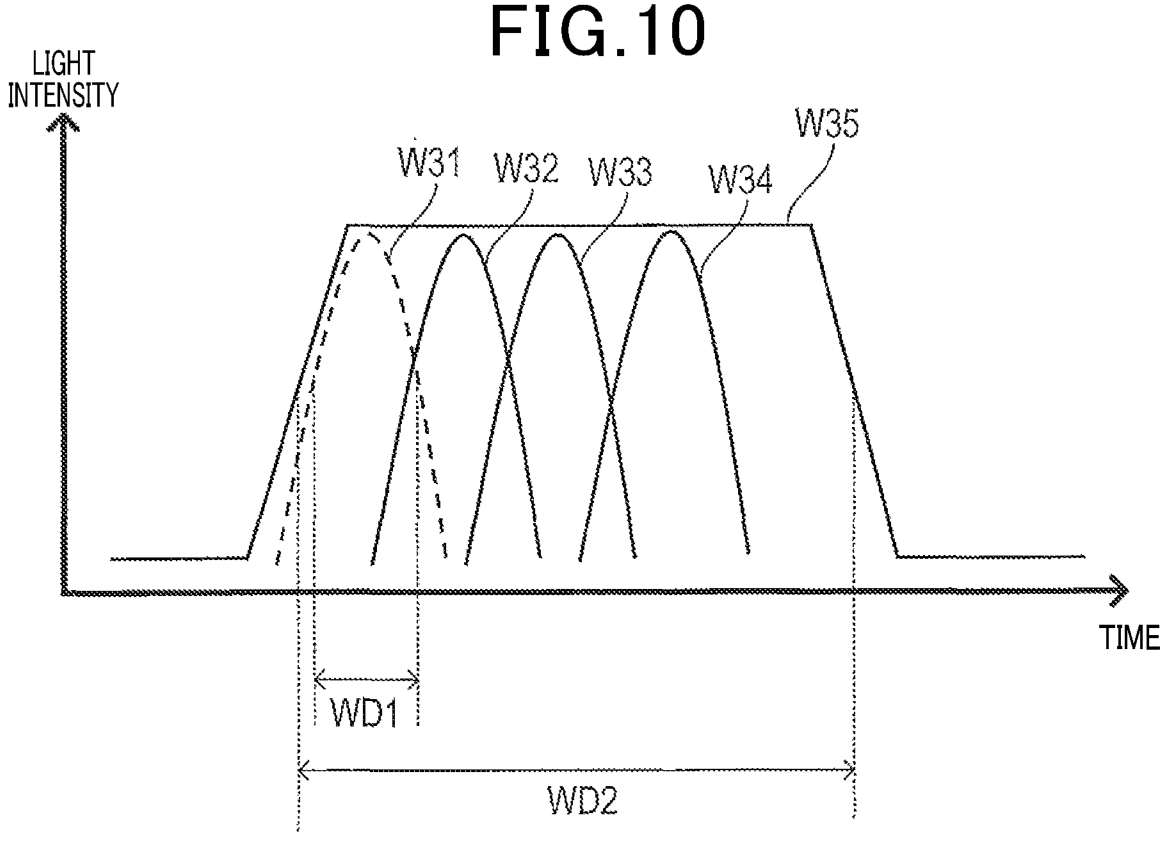
FIG. 10 is an illustration of a received-light waveform in the case of multiple reflections occurring.

The waveform W31 illustrated in FIG. 10 is a signal waveform acquired by receiving the signal light when multiple reflections are not occurring. The waveforms W32, W33, W34 illustrated in FIG. 10 are signal waveforms acquired by receiving the signal light of each of the multiple reflections when multiple reflections are occurring. The waveform W35 illustrated in FIG. 10 is a signal waveform acquired when multiple reflections are occurring. The waveform W35 is acquired by superimposing waveforms caused by the multiple reflections (i.e., the waveforms W31, W32, W33, W34).

A pulse width WD2 of the signal waveform in the case where multiple reflections are occurring is greater than a pulse width WD1 of a signal waveform in the case where multiple reflections are not occurring. Therefore, it is possible to detect a waveform anomaly caused by multiple reflections using the pulse width.

Then, as illustrated in FIG. 3, at S130, the CPU 51 determines whether the value stored in the RAM 53 as the pixel indication value i is greater than or equal to the total number of pixels k. If the value stored as the pixel indication value i is less than the total number of pixels k, the CPU 51 proceeds to S140 and stores the value stored as the pixel indication value i plus one in the RAM 53 as the pixel indication value i, and then proceeds to S20.

If the value stored as the pixel indication value i is greater than or equal to the total number of pixels k, the CPU 51 terminates the distance measuring process.

The distance measuring device 1 configured as above includes the light emitting unit 2, the light receiving array unit 3, the counting unit 4, and the signal processing unit 5.

The light emitting unit 2 emits pulsed signal light. The light receiving array unit 3 includes a plurality of photodetectors 31 that output pulse signals in response to incidence of photons.

The counting unit 4 and the signal processing unit 5 generate, according to the multiple pulse signals output from the light receiving array unit 3, pixel histograms showing time variations in the light intensity detected by the light receiving array unit 3, with the pixel histograms starting from the timing of signal light emission by the light emitting unit 2.

Based on each of the generated pixel histograms, the signal processing unit 5 calculates the noise intensity that indicates the light intensity of light detected by the light receiving array unit 3 when no signal light is received by the light receiving array unit 3.

Based on each of the generated pixel histograms, the signal processing unit 5 calculates the signal intensity that indicates the light intensity of the signal light received by the light receiving array unit 3.

Based on each of the generated pixel histograms, the signal processing unit 5 calculates the rise time Tu and the fall time Td of the signal light detected by the light receiving array unit 3.

The signal processing unit 5 corrects the calculated rise time Tu and the calculated fall time Td based on the calculated noise intensity and the calculated signal intensity. Specifically, the signal processing unit 5 corrects the rise time Tu based on the signal intensity and corrects the fall time Td based on the noise intensity.

The signal processing unit 5 calculates the object distance based on the corrected rise time Tu and the corrected fall time Td.

In such a manner, the distance measuring device 1 corrects the rise time Tu and the fall time Td based on the noise intensity and the signal intensity, and further calculates the object distance based on the corrected rise time Tu and the corrected fall time Td. Therefore, the distance measuring device 1 can suppress variations in distance measurement caused by the noise intensity and the signal intensity and improve the distance measurement accuracy.

The signal processing unit 5 calculates a pulse width of the signal light based on the corrected rise time and the corrected fall time. The signal processing unit 5 determines whether the calculated pulse width is greater than or equal to a preset calculation criterion value. The signal processing unit 5 then switches between the methods of calculating the object distance according to the determination of the pulse width. Specifically, in response to determining that the pulse width is less than the calculation criterion value, the signal processing unit 5 calculates the object distance using both the corrected rise time and corrected fall time. In response to determining that the pulse width is greater than or equal to the calculation criterion value, the signal processing unit 5 calculates the object distance using only the corrected rise time, out of the corrected rise time and the corrected fall time.

This allows the distance measuring device 1 to suppress degradation of the distance measurement accuracy caused by multiple reflections, if any, of signal light between a highly reflective object and the distance measuring device 1.

The pulse width calculated using the uncorrected rise time Tu and the uncorrected fall time Td may vary depending on the signal intensity and the noise strength. Thus, the calculation criterion value can not be set properly. In the present embodiment, variations in the pulse width calculated using the corrected rise time Tu and the corrected fall time Td, depending on the signal intensity and the noise intensity, are suppressed to be small. Therefore, the calculation criterion value can be set properly.

Figure 1B:
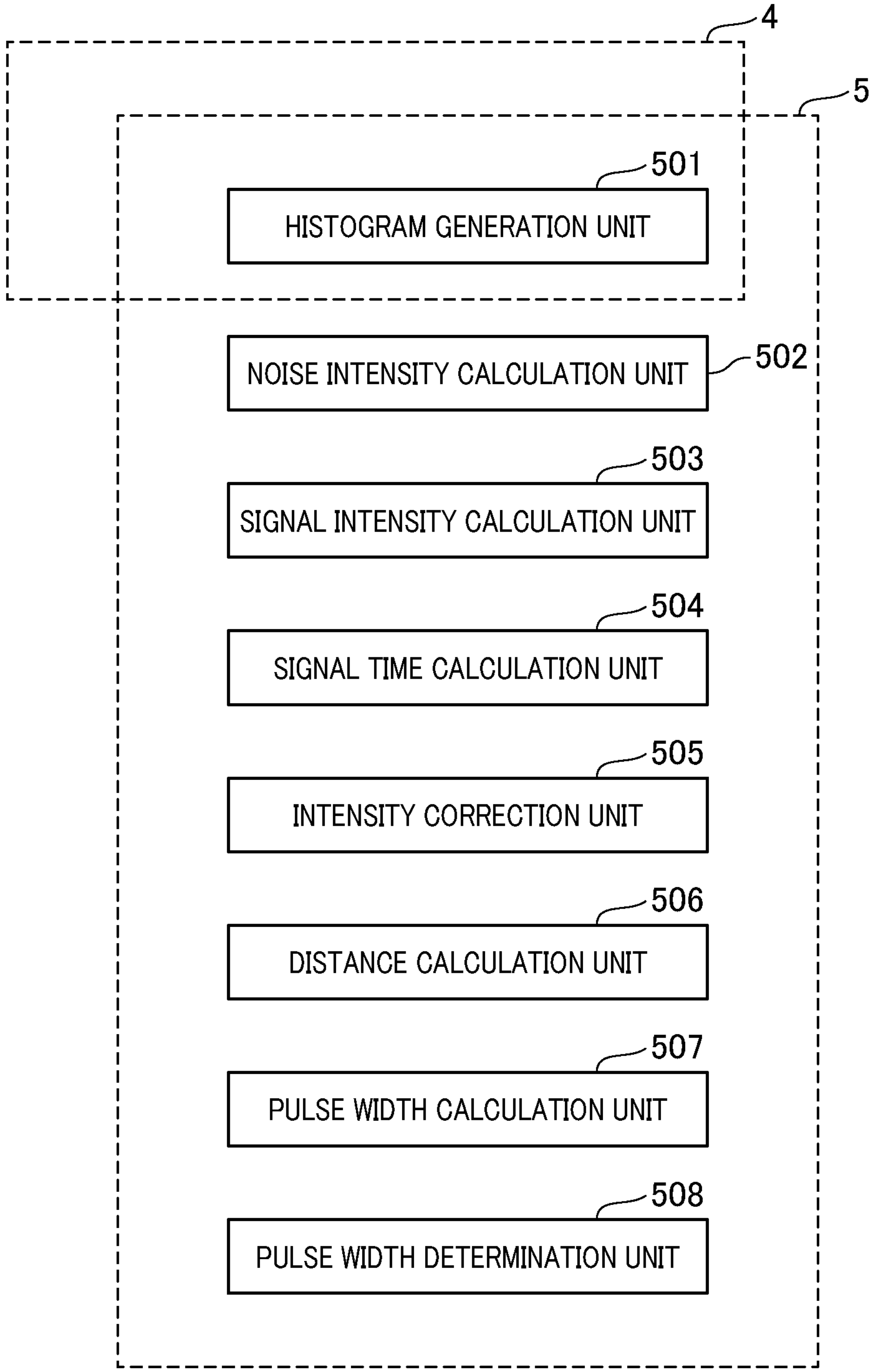
FIG. 1B is a functional block diagram of a signal processing unit according to the first embodiment.

FIG. 1B illustrates a functional block diagram of the signal processing unit 5. The signal processing unit 5 includes, as functional blocks, part of a histogram generation unit 501, a noise intensity calculation unit 502, a signal intensity calculation unit 503, a signal time calculation unit 504, an intensity correction unit 505, a distance calculation unit 506, a pulse width calculation unit 507, and a pulse width determination unit 508. Functions of these functional blocks are implemented by the CPU 51 executing a program stored in the ROM 52.

In the embodiment described above, the counting unit 4, S20, and S30 correspond to processing performed by the histogram generation unit 501. S40 corresponds to processing performed by the noise intensity calculation unit 502, and S50 corresponds to processing performed by the signal intensity calculation unit 503. The pixel histograms correspond to histograms.

S60 corresponds to processing performed by the signal time calculation unit 504. S70 and S80 correspond to processing performed by the intensity correction unit 505. S110 and S120 correspond to processing performed by the distance calculation unit 506.

S90 corresponds to processing performed by the pulse width calculation unit 507, and S100 corresponds to processing performed by the pulse width determination unit 508.

Second Embodiment

A second embodiment of the present disclosure will now be described with reference to the accompanying drawings. In the second embodiment, only a part different from that of the first embodiment will be described. The same reference numerals are assigned to the common components.

The distance measuring device 1 of the second embodiment differs from that of the first embodiment in that the distance measuring process is modified.

Figure 11:
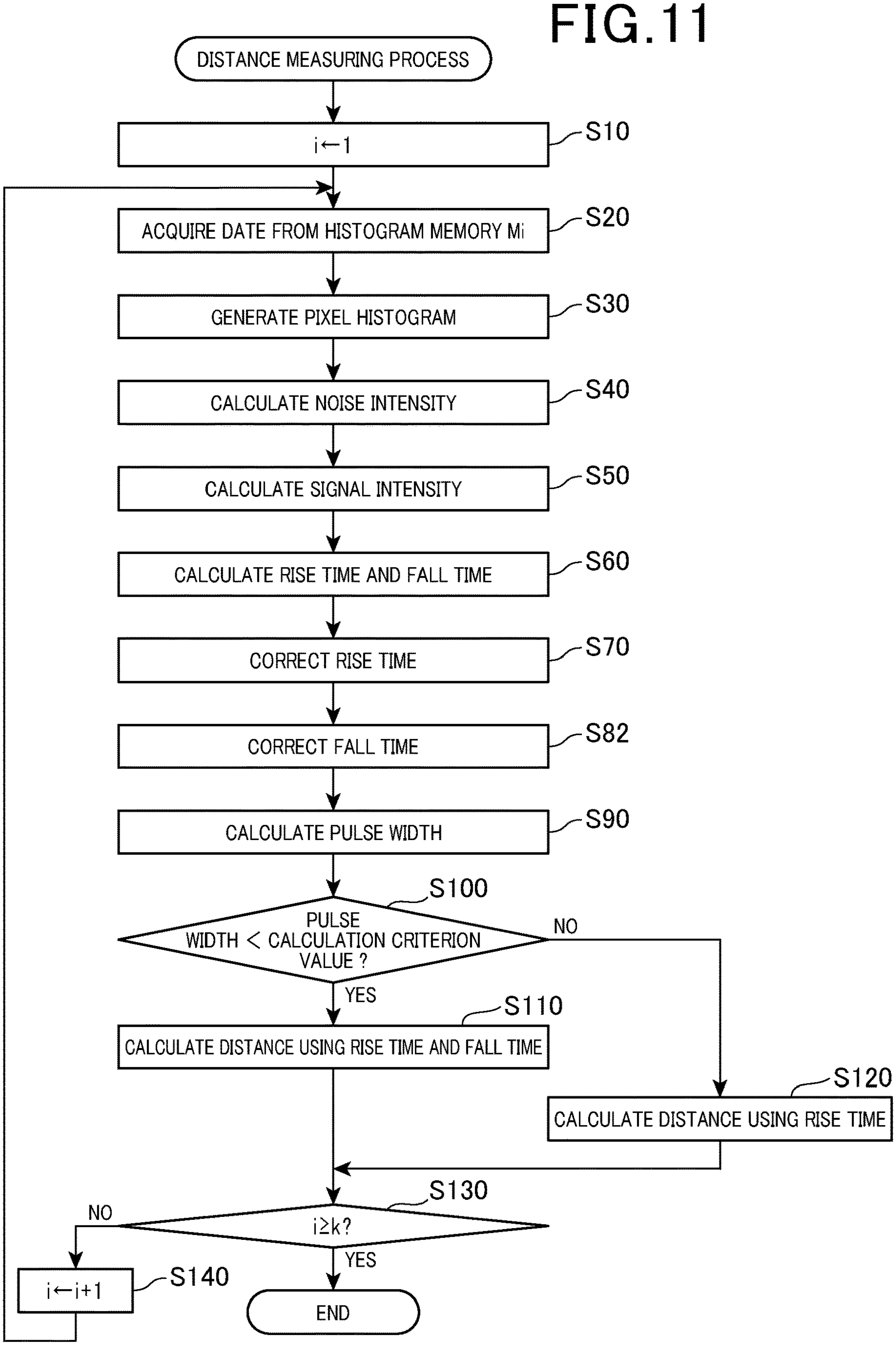
FIG. 11 is a flowchart illustrating a distance measuring process according to a second embodiment.

The distance measuring process of the second embodiment differs from that of the first embodiment in that the process step S82 is performed instead of S80, as illustrated in FIG. 11.

That is, upon completion of the process at S70, the CPU 51, at S82, corrects the fall time Td, and then proceeds to S90.

Figure 12:
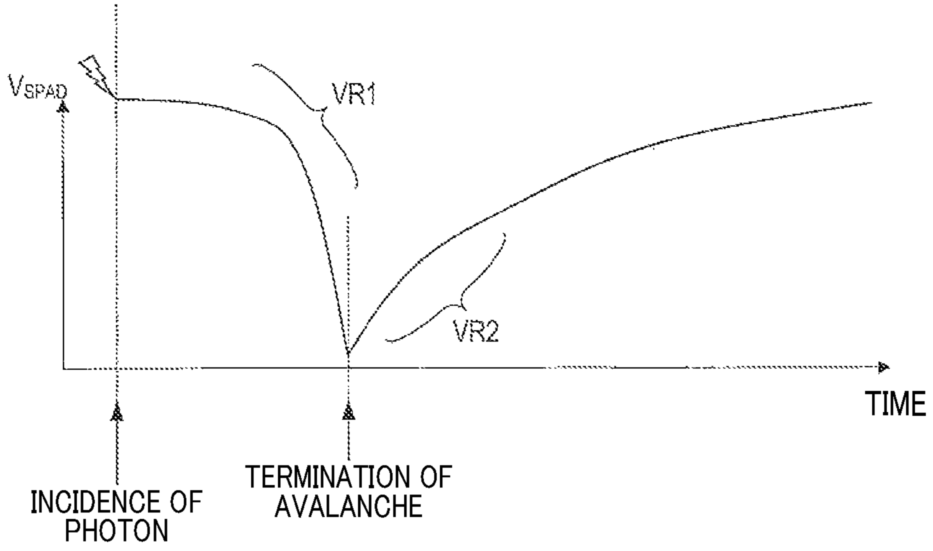
FIG. 12 illustrates changes in voltage across a SPAD after incidence of a photon.

As illustrated in FIG. 12, upon incidence of a photon on an SPAD 61, the SPAD 61 breaks down and current flows through the quench resistor 62. Since a voltage drop occurs in the quench resistor 62, the voltage across the SPAD 61, $V_{SPAD}$, drops once. Thereafter, the SPAD 61 is recharged through the quench resistor 62 and the voltage $V_{SPAD}$ thereby increases, which allows the voltage $V_{SPAD}$ to return to an initial voltage at which the SPAD 61 can respond to incidence of a photon.

When avalanche multiplication occurs upon incidence of the photon on the SPAD 61, the number of carriers in the SPAD 61 increases exponentially with time. Therefore, until the avalanche multiplication terminates (see, for example, the region VR1 of voltage drop in FIG. 12), the SPAD 61 can not respond to any incoming photon. That is, the SPAD 61 has no sensitivity. In addition, since the sensitivity of the SPAD 61 depends on the $V_{SPAD}$, the sensitivity of SPAD 61 is low in a region where the $V_{SPAD}$ is low (see, for example, the region VR2 of voltage rise in FIG. 12).

Figure 13:
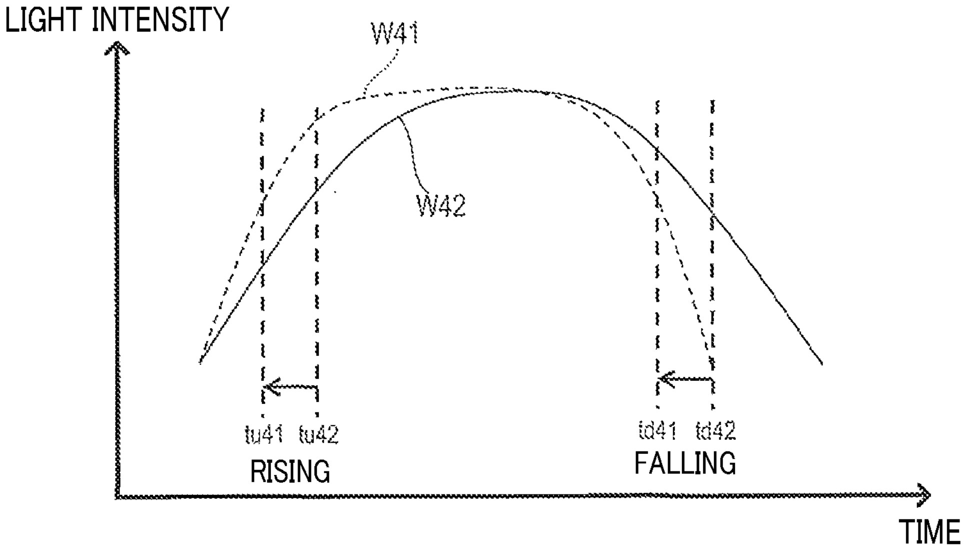
FIG. 13 is an illustration of variance of a received-light waveform at each of rise and fall times with the signal intensity.

In a case where an emission width of the signal light is small (i.e., in a case where incidence of the signal light terminates while the sensitivity of the SPAD 61 is low), a re-response to the signal light is less prone to occur. Thus, as illustrated in FIG. 13, as the rise time of the received-light waveform becomes earlier, the fall time of the received-light waveform also becomes earlier. FIG. 13 illustrates the rise time and the fall time of the received-light waveform W41 with high signal intensity, and the rise time and the fall time of the received-light waveform W42 with low signal intensity. The rise time tu41 of the received-light waveform W41 is earlier than the rise time tu42 of the received-light waveform W42. The fall time td41 of the received-light waveform W41 is earlier than the fall time td42 of the received-light waveform W42.

Figure 14:
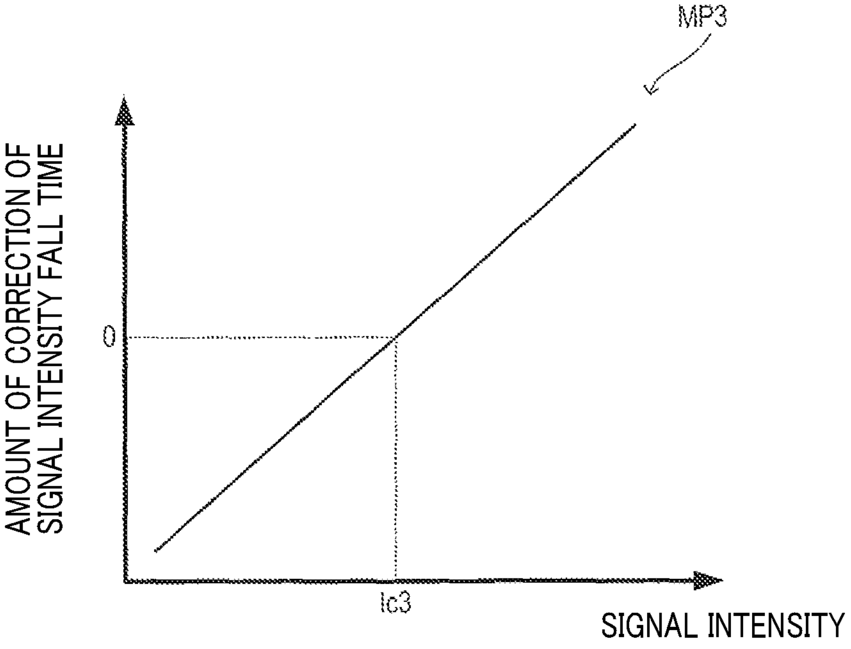
FIG. 14 is an illustration of a signal-intensity fall time correction map.

Specifically, at S82, the CPU 51 calculates, using the signal intensity calculated at S50, an amount of correction of the signal-intensity fall time with reference to a signal-intensity fall time correction map MP3 stored in the ROM 52. The signal-intensity fall time correction map MP3 sets a correspondence relationship between the signal intensity and the amount of correction of the signal intensity fall time, as illustrated in FIG. 14, for example. The signal-intensity fall time correction map MP3 illustrated in FIG. 14, for example, indicates the correspondence relationship between the signal intensity and the amount of correction of the signal-intensity fall time such that the amount of correction of the signal-intensity fall time is zero at an intermediate reference intensity Ic3. That is, for the signal intensity lower than the reference intensity Ic3, the amount of correction of the signal-intensity fall time is negative. The larger the difference between the signal intensity and the reference intensity Ic3, the larger the absolute value of the amount of correction of the signal intensity fall time. For the signal intensity higher than the reference intensity Ic3, the amount of correction of the signal intensity fall time is positive. The larger the difference between the signal intensity and the reference intensity Ic3, the larger the absolute value of the amount of correction of the signal intensity fall time. Therefore, for the signal intensity lower than the reference intensity Ic3, the fall time Td is corrected to be decreased. For the signal intensity higher than the reference intensity Ic3, the fall time Td is corrected to be increased.

The CPU 51 then calculates a sum of the calculated amount of correction of the signal-intensity fall time and the fall time Td. This summed value is used as a corrected fall time. Correction of the fall time Td at S82 is thereby completed.

The distance measuring device 1 configured as above includes the light emitting unit 2, the light receiving array unit 3, and the signal processing unit 5.

The light emitting unit 2 emits pulsed signal light. The light receiving array unit 3 includes a plurality of photodetectors 31 that output pulse signals in response to incidence of photons.

The signal processing unit 5 calculates the signal intensity that indicates the light intensity of the signal light received by the light receiving array unit 3.

The signal processing unit 5 calculates the rise time Tu and the fall time Td of the signal light detected by the light receiving array unit 3.

The signal processing unit 5 corrects the calculated rise time Tu and the calculated fall time Td based on the calculated signal intensity.

The signal processing unit 5 calculates the object distance based on the corrected rise time Tu and the corrected fall time Td.

In such a manner, the distance measuring device 1 corrects the rise time Tu and the fall time Td based on the signal intensity, and further calculates the object distance based on the corrected rise time Tu and the corrected fall time Td. Therefore, the distance measuring device 1 can suppress variations in distance measurement caused by the signal intensity and improve the distance measurement accuracy.

In the embodiment described above, the process steps S70 and S82 correspond to processing performed by the intensity correction unit 505 (see FIG. 1B).

Third Embodiment

A third embodiment of the present disclosure will now be described with reference to the accompanying drawings. In the third embodiment, only a part different from that of the first embodiment will be described. The same reference numerals are assigned to the common components.

The distance measuring device 1 of the third embodiment differs from that of the first embodiment in that the distance measuring device 1 is modified in configuration and the distance measuring process is modified.

Figure 15A:
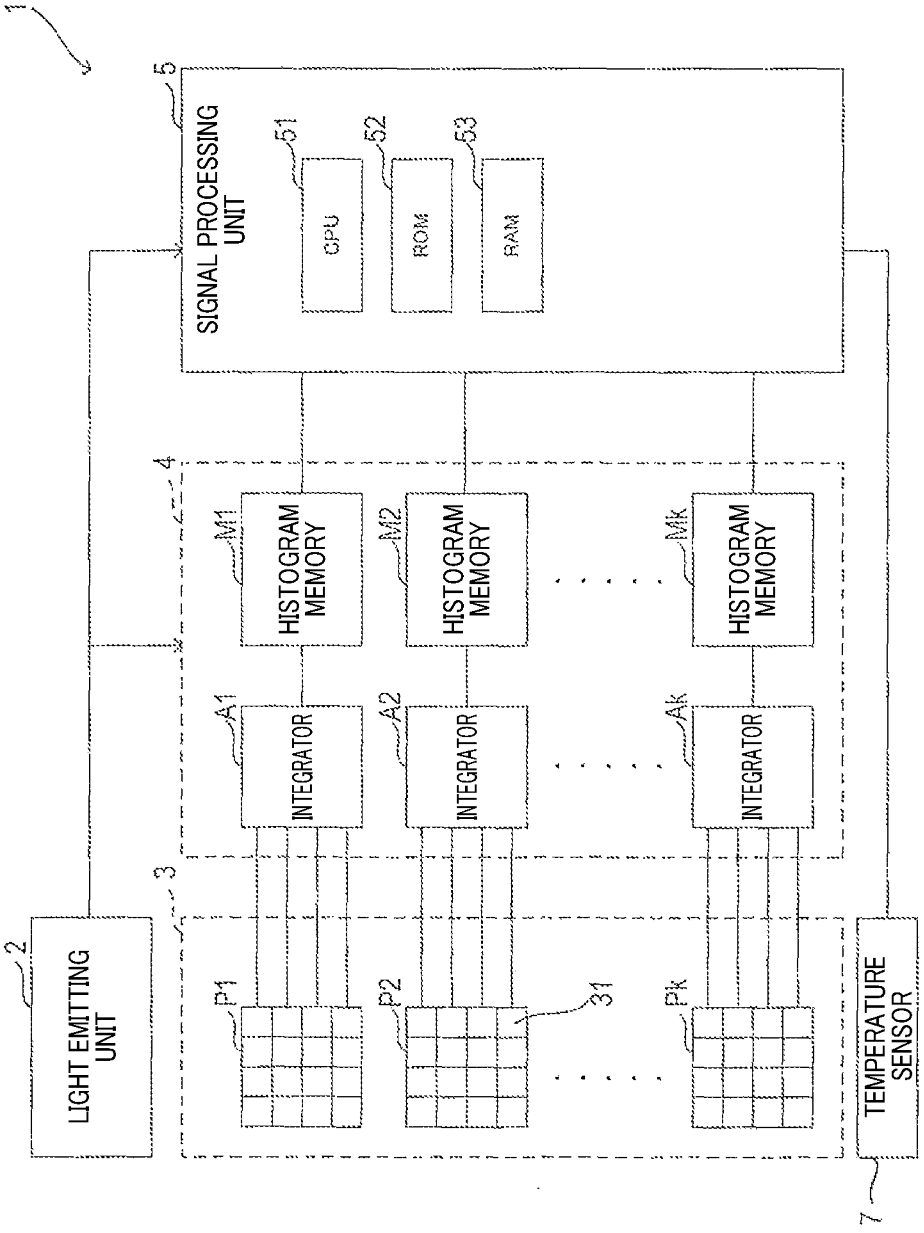
FIG. 15A is a block diagram of a distance measuring device according to a third embodiment.

The distance measuring device 1 of the third embodiment differs from that of the first embodiment in that a temperature sensor 7 is added as illustrated in FIG. 15A.

The temperature sensor 7 detects a temperature of the light receiving array unit 3 and outputs a temperature detection signal indicating a result of detection to the signal processing unit 5.

Figure 16:
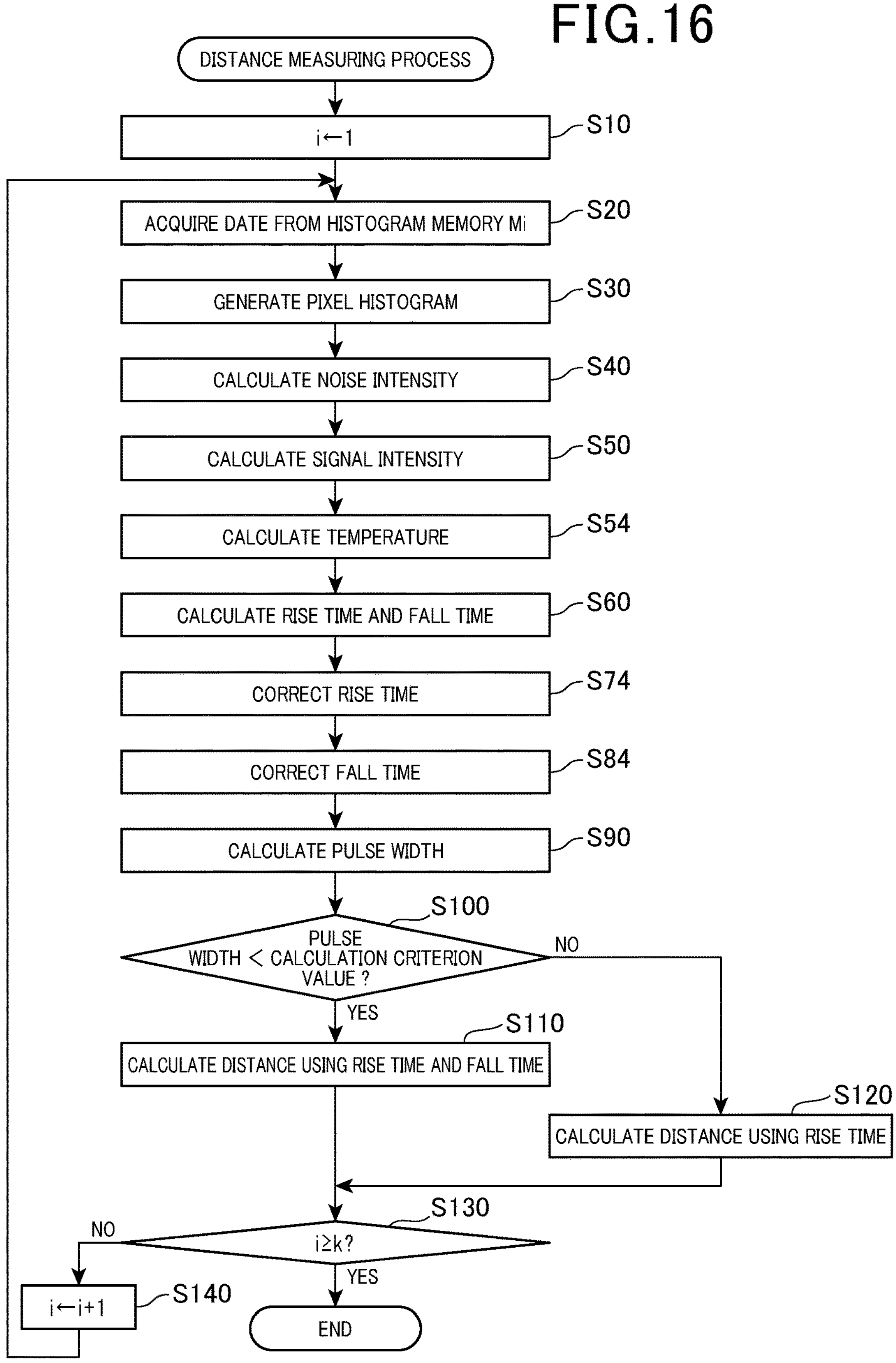
FIG. 16 is a flowchart illustrating a distance measuring process according to the third embodiment.

The third embodiment of the distance measuring process, as illustrated in FIG. 16, differs from that of the first embodiment in that the process step S54 is added and the process steps S74, S 84 are performed instead of S70 and S80.

That is, upon completion of the process at S50, the CPU 51, at S54, calculates the temperature of the light receiving array unit 3 based on the temperature detection signal from the temperature sensor 7, and proceeds to S60.

Upon completion of the process at S60, the CPU 51 corrects the rise time Tu at S74. Further, the CPU 51 corrects the fall time Td at S84 and then proceeds to S90.

Figure 17:
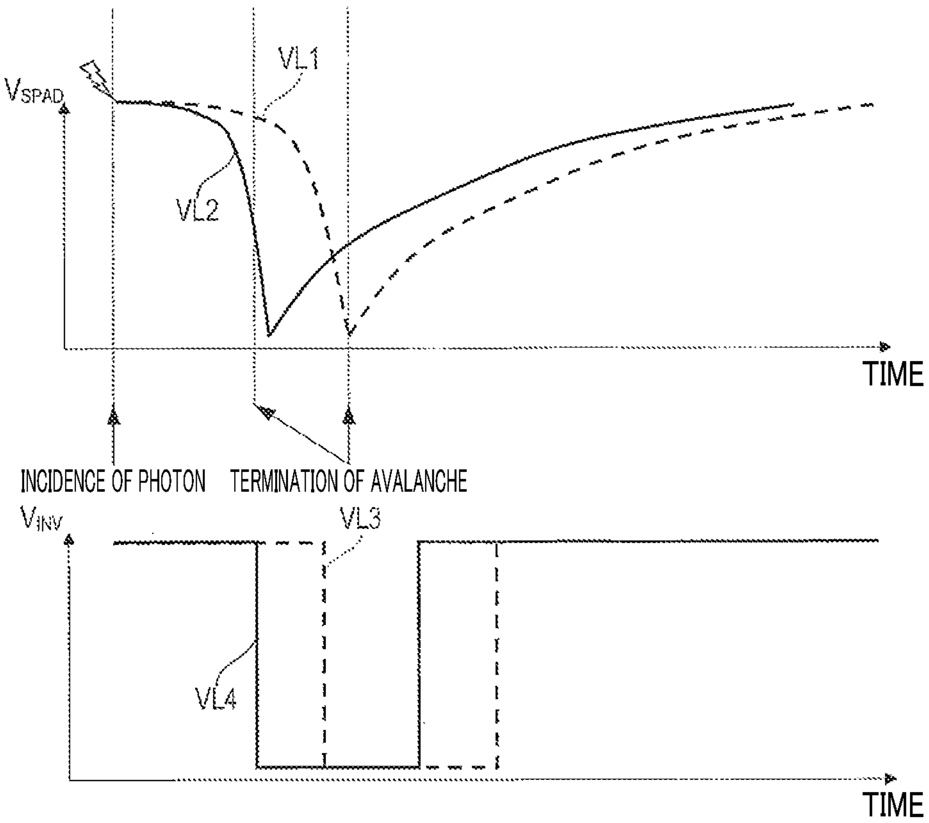
FIG. 17 is an illustration of variance of time variations in each of voltage between both ends and output voltage with temperature.

For each of the SPADs 61, the line VL1 in FIG. 17 illustrates time variations of the voltage $V_{SPAD}$ across the SPAD 61 when the temperature of the SPAD 61 is high. The line VL2 in FIG. 17 illustrates time variations of the voltage $V_{SPAD}$ across the SPAD 61 when the temperature of the SPAD 61 is low. The line VL3 in FIG. 17 illustrates time variations of the output voltage $V_{INV}$ of the pulse output unit 63 when the temperature of the SPAD 61 is high. The line VL4 in FIG. 17 illustrates time variations of the output voltage $V_{INV}$ of the pulse output unit 63 when the temperature of the SPAD 61 is low.

As illustrated in FIG. 17, the time it takes for avalanche to terminate varies depending on the temperature of the SPAD 61. Thus, a time from incidence of a photon on the SPAD 61 to the output voltage of the pulse output unit 63 falling to a low level varies depending on the temperature of the SPAD 61.

The rise time when the temperature of SPAD 61 is low is earlier than when the temperature of the SPAD 61 is high. The fall time when the temperature of the SPAD 61 is low is earlier than when the temperature of SPAD 61 is high.

Specifically, at S74, the CPU 51 calculates, using the temperature calculated at S54, an amount of correction of the temperature rise time with reference to a temperature rise time correction map MP4 stored in the ROM 52. The temperature rise time correction map MP4 sets a correspondence relationship between the temperature of the light receiving array unit 3 and the amount of correction of the temperature rise time, as illustrated in FIG. 18, for example.

Figure 18:
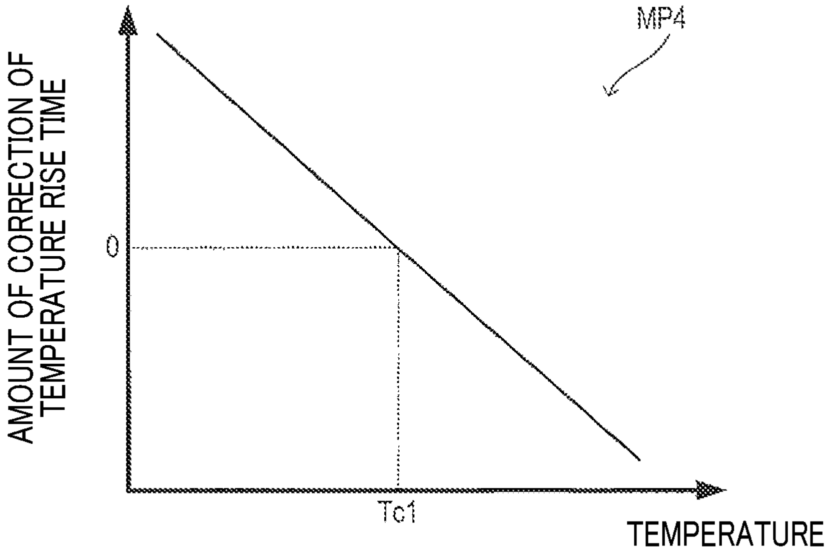
FIG. 18 is an illustration of a temperature rise time correction map and a temperature fall time correction map.
Figure 18:
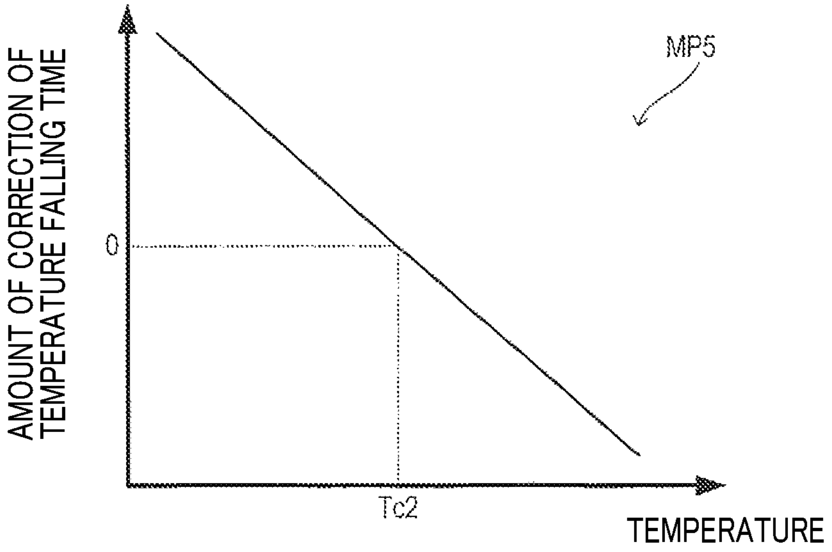

The temperature rise time correction map MP4 illustrated in FIG. 18, for example, indicates the correspondence relationship between the temperature and the amount of correction of the temperature rise time such that the amount of correction of the temperature rise time is zero at an intermediate reference temperature Tc1. That is, for the temperature lower than the reference temperature Tc1, the amount of correction of the temperature rise time is positive. The larger the difference between the temperature and the reference temperature Tc1, the larger the absolute value of the amount of correction of the temperature rise time. For the temperature higher than the reference temperature Tc1, the amount of correction of the temperature rise time is negative. The larger the difference between the temperature and the reference temperature Tc1, the larger the absolute value of the amount of correction of the temperature rise time.

Therefore, for the temperature lower than the reference temperature Tc1, the rise time Tu is corrected to be increased. For the temperature higher than the reference intensity Ic1, the rise time Tu is corrected to be decreased.

The CPU 51 then calculates a sum of the calculated amount of correction of the temperature rise time and the rise time Tu. This summed value is used as a corrected rise time. Correction of the rise time Tu at S74 is thereby completed.

Specifically, at S84, the CPU 51 calculates, using the temperature calculated at S54, an amount of correction of the temperature fall time with reference to a temperature fall time correction map MP5 stored in the ROM 52. The temperature fall time correction map MP5 sets a correspondence relationship between the temperature of the light receiving array unit 3 and the amount of correction of the temperature fall time, as illustrated in FIG. 18, for example.

The temperature fall time correction map MP5 illustrated in FIG. 18, for example, indicates the correspondence relationship between the temperature and the amount of correction of the temperature fall time such that the amount of correction of the temperature fall time is zero at an intermediate reference temperature Tc2. That is, for the temperature lower than the reference temperature Tc2, the amount of correction of the temperature fall time is positive. The larger the difference between the temperature and the reference temperature Tc2, the larger the absolute value of the amount of correction of the temperature fall time. For the temperature higher than the reference temperature Tc2, the amount of correction of the temperature fall time is negative. The larger the difference between the temperature and the reference temperature Tc2, the larger the absolute value of the amount of correction of the temperature fall time.

Therefore, for the temperature lower than the reference temperature Tc2, the fall time Td is corrected to be increased. For the temperature higher than the reference intensity Tc2, the fall time Td is corrected to be decreased.

The CPU 51 then calculates a sum of the calculated amount of correction of the temperature fall time and the fall time Td. This summed value is used as a corrected fall time. Correction of the fall time Td at S84 is thereby completed.

The distance measuring device 1 includes the light emitting unit 2, the light receiving array unit 3, the temperature sensor 7, and the signal processing unit 5.

The light emitting unit 2 emits pulsed signal light. The light receiving array unit 3 includes a plurality of photodetectors 31 that output pulse signals in response to incidence of photons. The temperature sensor 7 detects a temperature of the light receiving array unit 3.

The signal processing unit 5 calculates the rise time Tu and the fall time Td of the signal light detected by the light receiving array unit 3.

The signal processing unit 5 corrects the calculated rise time Tu and the calculated fall time Td based on the temperature detected by temperature sensor 7.

The signal processing unit 5 calculates the object distance based on the corrected rise time Tu and the corrected fall time Td.

In such a manner, the distance measuring device 1 corrects the rise time Tu and the fall time Td based on the temperature of the light receiving array unit 3, and further calculates the object distance based on the corrected rise time Tu and the corrected fall time Td. Therefore, the distance measuring device 1 can suppress variations in distance measurement caused by the temperature of the light receiving array unit 3 and improve the distance measurement accuracy.

Figure 15B:
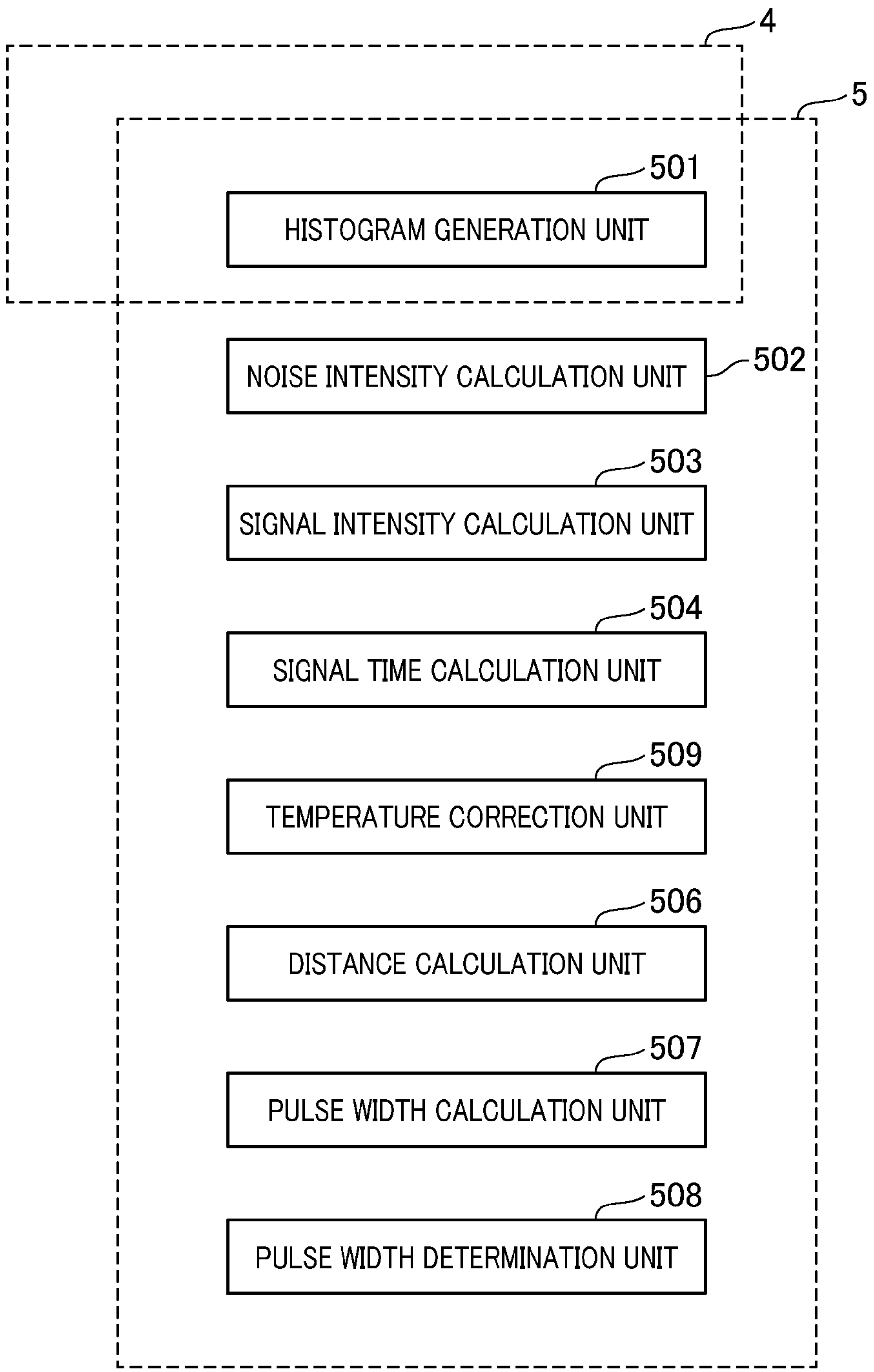
FIG. 15B is a functional block diagram of a signal processing unit according to the third embodiment.

In the embodiment described above, the temperature sensor 7 corresponds to a temperature detection unit, and the process steps S74 and S84 correspond to processing performed by a temperature correction unit 509. As illustrated in FIG. 15B, which is a functional block diagram of the signal processing unit 5, the temperature correction unit 509 is included in the signal processing unit 5 instead of the intensity correction unit 505 of the first embodiment. As in the first embodiment, the function of the temperature correction unit 509 is implemented by the CPU 51 executing the program stored in the ROM 52.

Fourth Embodiment

A fourth embodiment of the present disclosure will now be described with reference to the accompanying drawings. In the fourth embodiment, only a part different from that of the first embodiment will be described. The same reference numerals are assigned to the common components.

The distance measuring device 1 of the fourth embodiment differs from that of the first embodiment in that the distance measuring device 1 is modified in configuration and the distance measuring process is modified.

The distance measuring device 1 of the fourth embodiment differs from that of the first embodiment in that the temperature sensor 7 of the third embodiment is added as illustrated in FIG. 15A.

Figure 19:
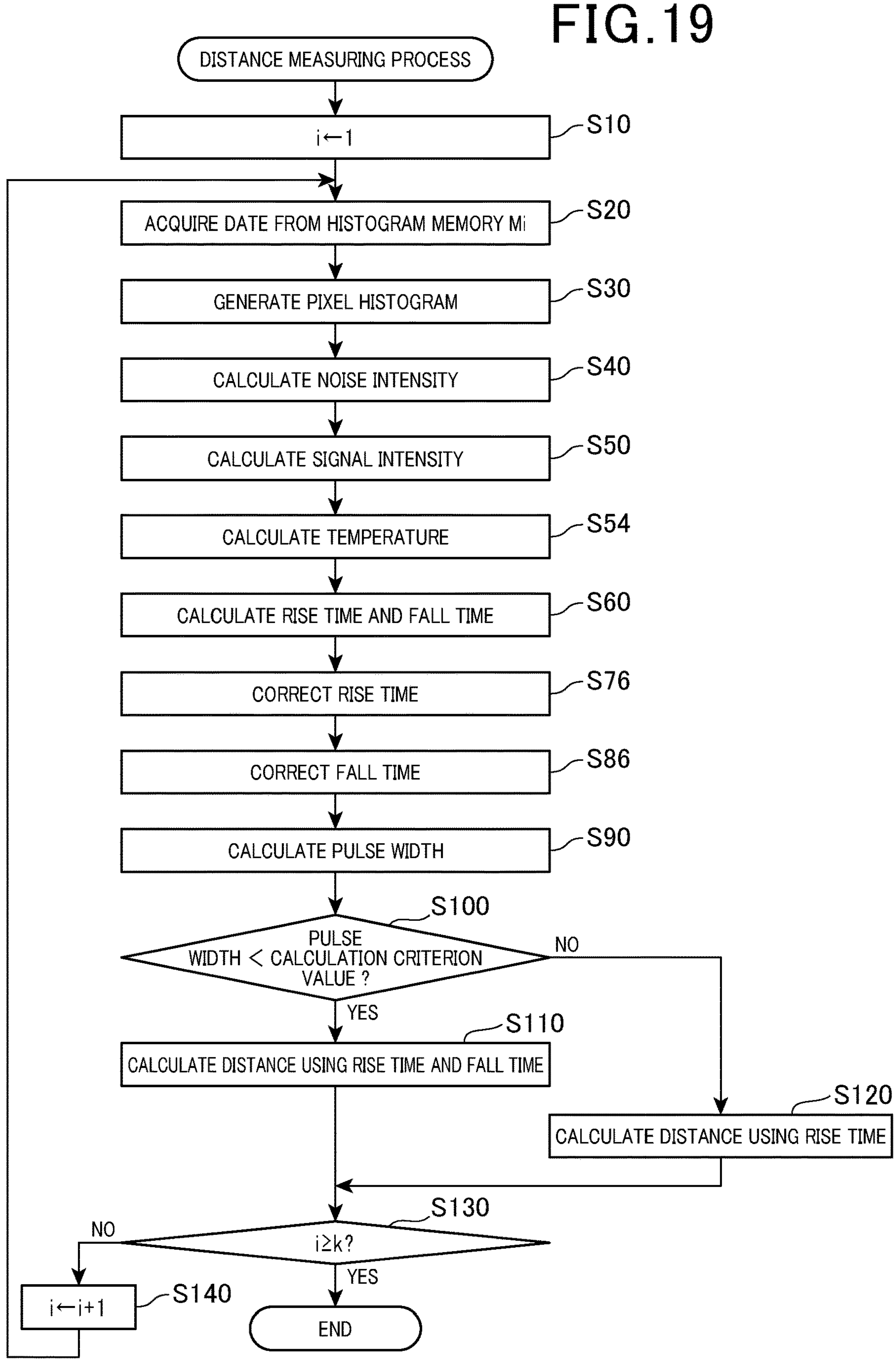
FIG. 19 is a flowchart illustrating a distance measuring process according to a fourth embodiment.

The fourth embodiment of the distance measuring process, as illustrated in FIG. 19, differs from that of the first embodiment in that the process step S54 is added and the process steps S76, S86 are performed instead of S70 and S80.

That is, upon completion of the process at S50, the CPU 51, as in the third embodiment, at S54, calculates the temperature of the light receiving array unit 3 based on the temperature detection signal from the temperature sensor 7, and then proceeds to S60.

That is, upon completion of the process at S60, the CPU 51, at S76, corrects the rise time Tu. Further, the CPU 51 corrects the fall time Td at S86 and then proceeds to S90.

Specifically, at S76, as in the first embodiment, the CPU 51 calculates, using the signal intensity calculated at S50, an amount of correction of the signal-intensity rise time with reference to the signal-intensity rise time correction map MP1 stored in the ROM 52.

Further, as in the third embodiment, the CPU 51 calculates, using the temperature calculated at S54, an amount of correction of the temperature rise time with reference to the temperature rise time correction map MP4 stored in the ROM 52.

The CPU 51 then calculates a sum of the calculated amount of correction of the signal-intensity rise time, the calculated amount of correction of the temperature rise time, and the rise time Tu. This summed value is used as a corrected rise time. Correction of the rise time Tu at S76 is thereby completed.

Specifically, at S86, as in the first embodiment, the CPU 51 calculates, using the noise intensity calculated at S40, an amount of correction of the noise-intensity fall time with reference to the noise-intensity fall time correction map MP2 stored in the ROM 52.

Further, at S76, as in the second embodiment, the CPU 51 calculates, using the signal intensity calculated at S50, an amount of correction of the signal-intensity fall time with reference to the signal-intensity fall time correction map MP3 stored in the ROM 52.

Further, as in the third embodiment, the CPU 51 calculates, using the temperature calculated at S54, an amount of correction of the temperature fall time with reference to the temperature fall time correction map MP5 stored in the ROM 52.

The CPU 51 then calculates a sum of the calculated amount of correction of the noise-intensity fall time, the calculated amount of correction of the signal-intensity fall time, the calculated amount of correction of the temperature fall time, and the rise time Tu. This summed value is used as a corrected rise time. Correction of the rise time Tu at S86 is thereby completed.

The distance measuring device 1 configured as above includes the light emitting unit 2, the light receiving array unit 3, the temperature sensor 7, and the signal processing unit 5.

The signal processing unit 5 corrects the calculated rise time Tu and the calculated fall time Td based on the calculated noise intensity, the calculated signal intensity, and the temperature detected by the temperature sensor. Specifically, the signal processing unit 5 corrects the rise time Tu based on the signal intensity and the temperature and corrects the fall time Td based on the signal intensity, the noise intensity, and the temperature.

In such a manner, the distance measuring device 1 corrects the rise time Tu and the fall time Td based on the noise intensity, the signal intensity, and the temperature, and further calculates the object distance based on the corrected rise time Tu and the corrected fall time Td. Therefore, the distance measuring device 1 can suppress variations in distance measurement caused by the noise intensity, the signal intensity, and the temperature, and improve the distance measurement accuracy.

In the embodiment described above, the process steps S76 and S86 correspond to processing performed by the intensity correction unit 505 (as illustrated in 1B) and the temperature correction unit 509 (as illustrated in FIG. 15B).

Fifth Embodiment

A fifth embodiment of the present disclosure will now be described with reference to the accompanying drawings. In the fifth embodiment, only a part different from that of the first embodiment will be described. The same reference numerals are assigned to the common components.

The distance measuring device 1 of the fifth embodiment differs from that of the first embodiment in that the distance measuring process is modified.

Figure 20:
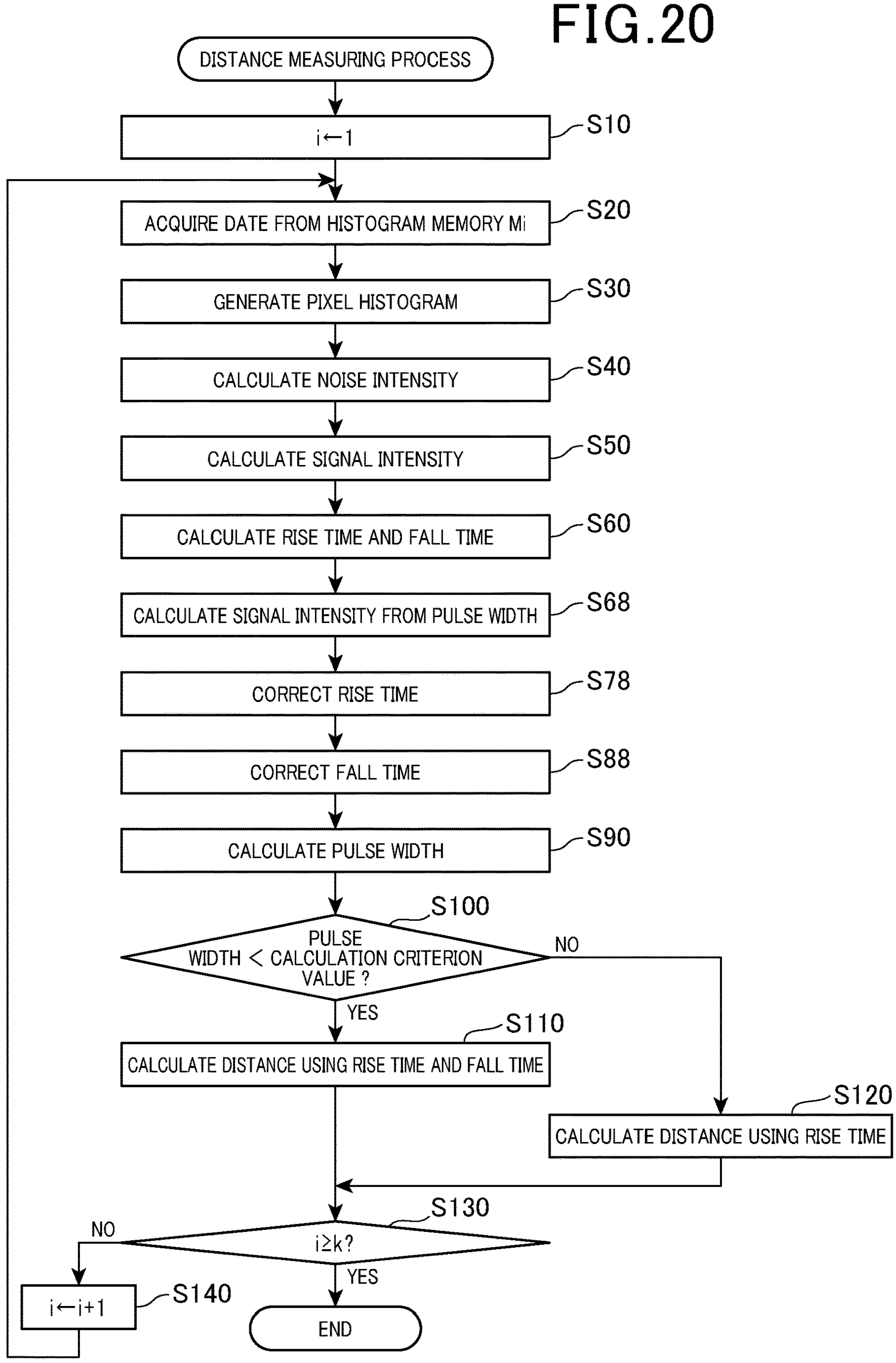
FIG. 20 is a flowchart illustrating a distance measuring process according to a fifth embodiment.

The fifth embodiment of the distance measuring process, as illustrated in FIG. 20, differs from that of the first embodiment in that the process step S68 is added and the process steps S78, S88 are performed instead of S70 and S80.

Figure 21:
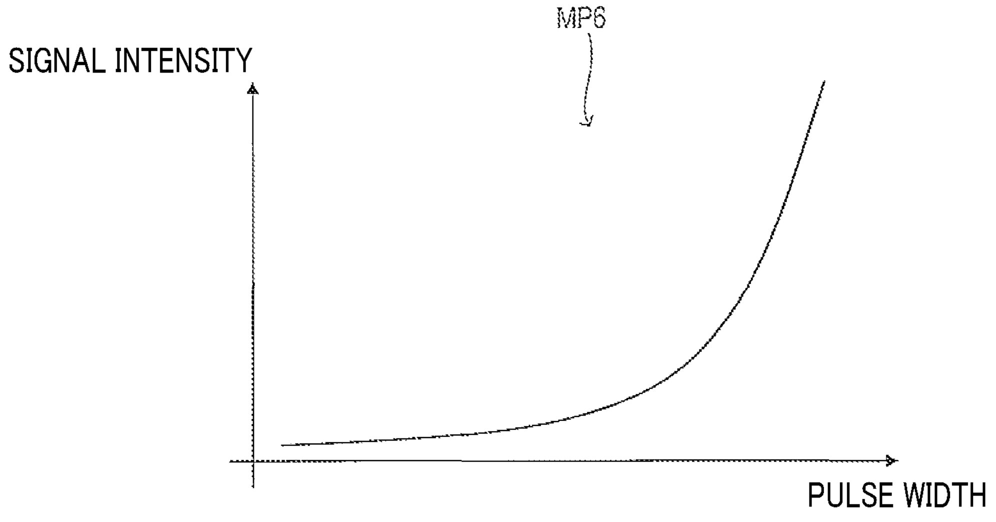
FIG. 21 is an illustration of a signal-intensity calculation map.

That is, upon completion of the process at S60, the CPU 51, at S68, calculates the signal intensity from the pulse width. Specifically, the CPU 51 calculates a subtracted value by subtracting the rise time Tu calculated at S60 from the fall time Td calculated at S60. This subtracted value is used as a pulse width. Further, the CPU 51 calculates, using the calculated pulse width, the signal intensity with reference to a signal-intensity calculation map MP6 stored in the ROM 52. In the signal-intensity calculation map MP6, as illustrated in FIG. 21, a correspondence relationship between the pulse width and the signal intensity is set such that the greater the pulse width, the higher the signal intensity.

That is, upon completion of the process at S68, the CPU 51, at S78 as illustrated in FIG. 20, corrects the rise time Tu. Specifically, the CPU 51 calculates, using the signal intensity calculated at S68, an amount of correction of the signal-intensity rise time with reference to the signal-intensity rise time correction map MP1. Then, the CPU 51 calculates a sum of the calculated amount of correction of the signal-intensity rise time and the rise time Tu. This summed value is used as the corrected rise time. This completes the correction of the rise time Tu at S78.

Subsequently, at S88, the CPU 51 corrects the fall time Td and then proceeds to S90. Specifically, the CPU 51 calculates, using the signal intensity calculated at S68, an amount of correction of the signal-intensity fall time with reference to the signal-intensity fall time correction map MP3. Then, the CPU 51 calculates a sum of the calculated amount of correction of the signal-intensity fall time and the fall time Td. This summed value is used as the corrected fall time. This completes the correction of the fall time Td at S88.

The distance measuring device 1 configured as above can calculate, based on the pulse width, a high signal intensity that exceeds a predefined upper limit detectable by the light receiving array unit 3. It should be noted that, in the light receiving array unit 3, when the signal intensity exceeds the predefined upper limit, the number of SPADs 61 that respond to incidence of photons is less prone to change.

This configuration allows the distance measuring device 1 to correct the rise time Tu and the fall time Td based on the signal intensity that exceeds the predefined upper limit detectable by the light receiving array unit 3. Therefore, the distance measuring device 1 can suppress variations in distance measurement caused by the signal intensity and improve the distance measurement accuracy.

As above, while the specific embodiments of the present disclosure have been described above, the present disclosure is not limited to the above-described embodiments, and may be implemented with various modifications.

First Modification

In the above embodiments, the amount of correction of the rise time and the amount of correction of the fall time are calculated with reference to the correction maps. In an alternative embodiment, the amount of correction of the rise time may be calculated using an equation representing the correspondence relationship between the signal intensity and the amount of correction of the rise time. In another alternative embodiment, the amount of correction of the fall time may be calculated using an equation representing the correspondence relationship between the noise intensity and the amount of correction of the fall time.

Second Modification

In the above embodiments, both the rise time Tu and the fall time Td are corrected. In an alternative embodiment, any one of the rise time Tu and the fall time Td may be corrected. For example, in an embodiment where only the rise time Tu, out of the rise time Tu and the fall time Td, is corrected, the object distance may be calculated based on the corrected rise time Tu (i.e., the corrected rise time) and the uncorrected fall time Td. In an embodiment where only the fall time Td, out of the rise time Tu and the fall time Td, is corrected, the object distance may be calculated based on the corrected fall time Td (i.e., the corrected fall time) and the uncorrected rise time Tu.

Third Modification

In the above embodiments, the correction maps that indicate linear correspondence relationships between the signal intensity, the noise intensity, or the temperature, and the amount of correction of the rise time or the amount of correction of the fall time are used to correct the rise time Tu or the fall time Td. In an alternative embodiment, the correction maps that indicate non-linear correspondence relationships between the signal intensity, the noise intensity, or the temperature, and the amount of correction of the rise time or the amount of correction of the fall time may be used to correct the rise time Tu or the fall time Td.

Fourth Modification

In the above embodiment, a sum of the amount of correction of the signal intensity fall time, the amount of correction of the noise intensity fall time, the amount of correction of the temperature fall time, and the fall time Td is calculated. This summed value is used as the corrected fall time. In an alternative embodiment, a sum of the amount of correction of the signal intensity fall time, the amount of correction of the noise intensity fall time, and the fall time Td may be calculated. This summed value may be used as the corrected fall time. In an alternative embodiment, a sum of the amount of correction of the signal intensity fall time, the amount of correction of the temperature fall time, and the fall time Td may be calculated. This summed value may be used as the corrected fall time. In an alternative embodiment, a sum of the amount of correction of the noise intensity fall time, the amount of correction of the temperature fall time, and the fall time Td may be calculated. This summed value may be used as the corrected fall time.

The signal processing unit 5 and its method described in the present disclosure may be implemented by a dedicated computer including a processor and a memory programmed to execute one or more functions embodied by computer programs. Alternatively, the signal processing unit 5 and its method described in the present disclosure may be implemented by a dedicated computer including a processor formed of one or more dedicated hardware logic circuits, or may be implemented by one or more dedicated computers including a combination of a processor and a memory programmed to execute one or more functions and a processor formed of one or more dedicated hardware logic circuits. The computer programs may be stored, as instructions to be executed by a computer, in a non-transitory, tangible computer-readable storage medium. The technique for implementing the functions of each part included in the signal processing unit 5 does not necessarily include software, and all of its functions may be implemented using one or more pieces of hardware.

A plurality of functions possessed by one constituent element in the foregoing embodiments may be implemented by a plurality of constituent elements, or one function possessed by one constituent element may be implemented by a plurality of constituent elements. In addition, a plurality of functions possessed by a plurality of constituent elements may be implemented by one constituent element, or one function implemented by a plurality of constituent elements may be implemented by one constituent element. Some of the components in the foregoing embodiments may be omitted. At least some of the components in the foregoing embodiments may be added to or replaced with the other embodiments.

Besides the distance measuring device 1 described above, the present disclosure can be implemented in various modes such as a system including the distance measuring device 1 as a constituent element, a program for causing a computer to serve as the distance measuring device 1, a non-transitory tangible storage medium, such as a semiconductor memory, storing this program, a ranging method, and others.

What is claimed is:

1. A distance measuring device comprising:

a light emitting unit configured to emit pulsed signal light;

a light receiving array unit including a plurality of photodetectors, each of which is configured to output a pulse signal in response to incidence of a photon;

a signal intensity calculation unit configured to calculate a signal intensity that indicates a light intensity of the signal light received by the light receiving array unit;

a signal time calculation unit configured to calculate a rise time and a fall time of the signal light detected by the light receiving array unit;

an intensity correction unit configured to correct at least one of the rise time and the fall time calculated by the signal time calculation unit based on the signal intensity calculated by the signal intensity calculation unit;

a distance calculation unit configured to, in response to the rise time being corrected, calculate an object distance that is a distance to an object that reflected the signal light, based on at least the corrected rise time, and in response to the fall time being corrected, calculate the object distance based on at least the corrected fall time;

a pulse width calculation unit configured to calculate a pulse width of the signal light based on the corrected rise time and the corrected fall time; and a pulse width determination unit configured to determine whether the pulse width calculated by the pulse width calculation unit is greater than or equal to a preset calculation criterion value, wherein the distance calculation unit is configured to switch between a plurality of methods of calculating the object distance according to a result of determination by the pulse width determination unit.

2. The distance measuring device according to claim 1, further comprising:

a temperature detection unit configured to detect a temperature of the light receiving array unit, wherein the intensity correction unit is further configured to correct at least one of the rise time and the fall time based on the temperature detected by the temperature detection unit.

3. The distance measuring device according to claim 1, further comprising:

a noise intensity calculation unit configured to calculate a noise intensity that indicates a light intensity of light detected by the light receiving array unit while the signal light is not received by the light receiving array unit, wherein the intensity correction unit is further configured to correct at least one of the rise time and the fall time based on the noise intensity calculated by the noise intensity calculation unit.

4. The distance measuring device according to claim 3, further comprising:

a histogram generation unit configured to generate, according to a plurality of the pulse signals output from the light receiving array unit, a histogram that indicates time variations in light intensity of light detected by the light receiving array unit, the histogram starting from an emission timing of the signal light emitted by the light emitting unit, wherein the noise intensity calculation unit is configured to calculate the noise intensity based on the histogram generated by the histogram generation unit.

5. The distance measuring device according to claim 3, further comprising:

a histogram generation unit configured to generate, according to a plurality of the pulse signals output from the light receiving array unit, a histogram that indicates time variations in light intensity of light detected by the light receiving array unit, the histogram starting from an emission timing of the signal light emitted by the light emitting unit, wherein the signal intensity calculation unit is configured to calculate the signal intensity based on the histogram generated by the histogram generation unit, and the noise intensity calculation unit is configured to calculate the noise intensity based on the histogram generated by the histogram generation unit.

6. The distance measuring device according to claim 3, wherein the intensity correction unit is configured to correct at least one of the rise time and the fall time calculated by the signal time calculation unit according to an equation representing a correspondence relationship between the noise intensity calculated by the noise intensity calculation unit and an amount of correction of the at least one of the rise time and the fall time.

7. The distance measuring device according to claim 1, further comprising:

a histogram generation unit configured to generate, according to a plurality of the pulse signals output from the light receiving array unit, a histogram that indicates time variations in light intensity of light detected by the light receiving array unit, the histogram starting from an emission timing of the signal light emitted by the light emitting unit, wherein the signal intensity calculation unit is configured to calculate the signal intensity based on the histogram generated by the histogram generation unit.

8. The distance measuring device according to claim 1, wherein the distance calculation unit is configured to, in response to the pulse width determination unit determining that the pulse width is less than the calculation criterion value, calculate the object distance using both the corrected rise time and the corrected fall time, and in response to the pulse width determination unit determining that the pulse width is greater than or equal to the calculation criterion value, calculate the object distance using only the corrected rise time among the corrected rise time and the corrected fall time.

9. The distance measuring device according to claim 1, wherein the intensity correction unit is configured to correct, with reference to a correction map, the at least one of the rise time and the fall time calculated by the signal time calculation unit based on the signal intensity calculated by the signal intensity calculation unit.

10. The distance measuring device according to claim 1, wherein the intensity correction unit is configured to correct at least one of the rise time and the fall time calculated by the signal time calculation unit according to an equation representing a correspondence relationship between the signal intensity calculated by the signal intensity calculation unit and an amount of correction of the at least one of the rise time and the fall time.

11. A distance measuring device comprising:

a light emitting unit configured to emit pulsed signal light;

a light receiving array unit including a plurality of photodetectors, each of which is configured to output a pulse signal in response to incidence of a photon;

a temperature detection unit configured to detect a temperature of the light receiving array unit;

a signal time calculation unit configured to calculate a rise time and a fall time of the signal light detected by the light receiving array unit;

a temperature correction unit configured to correct at least one of the rise time and the fall time calculated by the signal time calculation unit based on the temperature detected by the temperature detection unit;

a distance calculation unit configured to, in response to the rise time being corrected, calculate an object distance that is a distance to an object that reflected the signal light, based on at least the corrected rise time, and in response to the fall time being corrected, calculate the object distance based on at least the corrected fall time;

a pulse width calculation unit configured to calculate a pulse width of the signal light based on the corrected rise time and the corrected fall time; and a pulse width determination unit configured to determine whether the pulse width calculated by the pulse width calculation unit is greater than or equal to a preset calculation criterion value, wherein the distance calculation unit is configured to switch between a plurality of methods of calculating the object distance according to a result of determination by the pulse width determination unit.

12. The distance measuring device according to claim 11, further comprising:

a signal intensity calculation unit configured to calculate a signal intensity that indicates a light intensity of the signal light received by the light receiving array unit; and a temperature correction unit is further configured to correct at least one of the rise time and the fall time based on the signal intensity calculated by the signal intensity calculation unit.

13. The distance measuring device according to claim 12, further comprising:

a histogram generation unit configured to generate, according to a plurality of the pulse signals output from the light receiving array unit, a histogram that indicates time variations in light intensity of light detected by the light receiving array unit, the histogram starting from an emission timing of the signal light emitted by the light emitting unit, wherein the signal intensity calculation unit is configured to calculate the signal intensity based on the histogram generated by the histogram generation unit.

14. The distance measuring device according to claim 11, further comprising:

a noise intensity calculation unit configured to calculate a noise intensity that indicates a light intensity of light detected by the light receiving array unit while the signal light is not received by the light receiving array unit;

an intensity correction unit configured to correct at least one of the rise time and the fall time based on the noise intensity calculated by the noise intensity calculation unit.

15. The distance measuring device according to claim 14, further comprising:

a histogram generation unit configured to generate, according to a plurality of the pulse signals output from the light receiving array unit, a histogram that indicates time variations in light intensity of light detected by the light receiving array unit, the histogram starting from an emission timing of the signal light emitted by the light emitting unit, wherein the noise intensity calculation unit is configured to calculate the noise intensity based on the histogram generated by the histogram generation unit.

16. The distance measuring device according to claim 14, wherein the temperature correction unit is configured to correct at least one of the rise time and the fall time calculated by the signal time calculation unit according to an equation representing a correspondence relationship between the noise intensity calculated by the noise intensity calculation unit and an amount of correction of the at least one of the rise time and the fall time.

17. The distance measuring device according to claim 11, further comprising:

a signal intensity calculation unit configured to calculate a signal intensity that indicates a light intensity of the signal light received by the light receiving array unit; and a noise intensity calculation unit configured to calculate a noise intensity that indicates a light intensity of light detected by the light receiving array unit while the signal light is not received by the light receiving array unit, wherein the temperature correction unit is further configured to correct at least one of the rise time and the fall time based on the signal intensity calculated by the signal intensity calculation unit and the noise intensity calculated by the noise intensity calculation unit.

18. The distance measuring device according to claim 17, further comprising:

a histogram generation unit configured to generate, according to a plurality of the pulse signals output from the light receiving array unit, a histogram that indicates time variations in light intensity of light detected by the light receiving array unit, the histogram starting from an emission timing of the signal light emitted by the light emitting unit, wherein the signal intensity calculation unit is configured to calculate the signal intensity based on the histogram generated by the histogram generation unit, and the noise intensity calculation unit is configured to calculate the noise intensity based on the histogram generated by the histogram generation unit.

19. The distance measuring device according to claim 11, wherein the distance calculation unit is configured to, in response to the pulse width determination unit determining that the pulse width is less than the calculation criterion value, calculate the object distance using both the corrected rise time and the corrected fall time, and in response to the pulse width determination unit determining that the pulse width is greater than or equal to the calculation criterion value, calculate the object distance using only the corrected rise time among the corrected rise time and the corrected fall time.

20. The distance measuring device according to claim 11, wherein the temperature correction unit is configured to correct, with reference to a correction map, at least one of the rise time and the fall time calculated by the signal time calculation unit based on the temperature detected by the temperature detection unit.

21. The distance measuring device according to claim 11, wherein the temperature correction unit is configured to correct at least one of the rise time and the fall time calculated by the signal time calculation unit based on the temperature detected by the temperature detection unit according to an equation representing a correspondence relationship between the temperature detected by the temperature detection unit and an amount of correction of the at least one of the rise time and the fall time.

* * * * *